United States Patent [19]

Nishizaki et al.

[11] Patent Number: 5,443,922
[45] Date of Patent: Aug. 22, 1995

[54] ORGANIC THIN FILM ELECTROLUMINESCENCE ELEMENT

[75] Inventors: Kouji Nishizaki; Shigeki Takeuchi, both of Hachioji; Toyoko Shibata, Hino; Kiyoshi Tamaki, Hachioji, all of Japan

[73] Assignee: Konica Corporation, Tokyo, Japan

[21] Appl. No.: 967,997

[22] Filed: Oct. 28, 1992

[30] Foreign Application Priority Data

Nov. 7, 1991 [JP] Japan ................ 3-291541
Dec. 17, 1991 [JP] Japan ................ 3-333517

[51] Int. Cl.⁶ ............................ H05B 33/14
[52] U.S. Cl. .................... 428/690; 428/691; 428/917; 313/503; 313/504; 313/506
[58] Field of Search .......... 428/690, 917, 691; 313/503, 504, 506

[56] References Cited

U.S. PATENT DOCUMENTS

| | | | |
|---|---|---|---|
| 3,112,197 | 11/1963 | Neugebauer et al. | 96/1 |
| 3,180,729 | 4/1965 | Klupfel et al. | 96/1 |
| 3,189,447 | 6/1965 | Neugebauer et al. | 96/1 |
| 3,240,597 | 3/1966 | Fox | 96/1 |
| 3,257,203 | 6/1966 | Sus et al. | 96/1.5 |
| 3,526,501 | 9/1970 | Fox | 96/1.5 |
| 3,542,544 | 11/1970 | Seus et al. | 96/1.5 |
| 3,567,450 | 3/1971 | Brantly et al. | 96/1.5 |
| 3,615,402 | 10/1971 | Rule | 96/1.5 |
| 3,615,404 | 10/1971 | Price | 96/1.5 |
| 3,658,520 | 4/1972 | Brantly et al. | 96/1.6 |
| 3,717,462 | 2/1973 | Negishi et al. | 96/1.5 |
| 3,820,989 | 6/1974 | Rule et al. | 96/1.5 |
| 4,012,376 | 3/1977 | Wright et al. | 260/240 |
| 4,127,412 | 11/1978 | Rule et al. | 91/1 PC |
| 4,175,961 | 11/1979 | Wright et al. | 430/58 |
| 4,232,103 | 11/1980 | Limburg et al. | 430/59 |
| 4,278,746 | 7/1981 | Goto et al. | 430/59 |
| 4,356,429 | 10/1982 | Tang | 313/503 |
| 5,281,489 | 1/1994 | Mori et al. | 428/690 |

Primary Examiner—Charles R. Nold
Attorney, Agent, or Firm—Frishauf, Holtz, Goodman & Woodward

[57] ABSTRACT

An organic thin film electroluminescence element is disclosed. It comprises an organic compound represented by formula I in a luminescent layer or electron injection layer. The element may further comprises a compound represented by formula II in a hole injection layer.

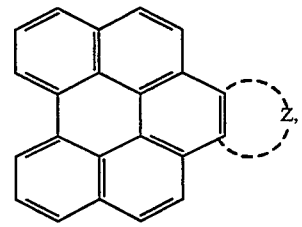

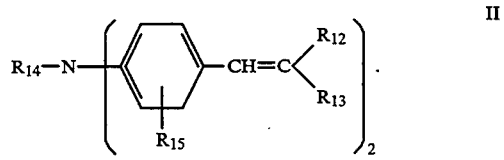

The definition is detailed in the description. The element has a greater intensity of luminescence and a high durability.

9 Claims, No Drawings

ORGANIC THIN FILM ELECTROLUMINESCENCE ELEMENT

TECHNICAL FIELD

The present invention relates to the thin film electroluminescent element, especially to the thin film electroluminescent element used for the plane light source and the flat display.

BACKGROUND OF THE INVENTION

The electroluminescent element comprises a pair of counter electrodes and an organic luminescent layer located of electrons injected into the luminescent layer by one of the electrodes, with holes injected into the luminescent layer by the other electrode, occurs within the luminescent layer whereby between the the electrodes; recombination the luminescent substance is excited to a higher energy level. Energy in the form of light is produced when the excited luminescent substance returns to the ground state, which is luminescence.

Since the thin film organic compound is used as a luminescent layer, the carrier injection type electroluminescence element has come to provide high intensity luminescence.

The U.S. Pat. No. 3,530,325 discloses the use of single crystal anthracene as luminescent substance, and Japanese Patent LOP No. 59-194393 shows a combination of the hole injection layer and organic layer of the luminescent substance as a luminescent substance, while a combination of hole injection and carrier layer and organic electron injection and carrier layer is disclosed in the Japanese Patent LOP No. 63-295695, and a combination of the hole traveling layer, luminescent layer and electron traveling layer is exhibited in JP. Journal of Applied Physics, VOL. 27, NO. 2, P.269–271.

The intensity of luminescence has been improved in the conventional electroluminescent element having the said configuration, but the intensity of luminescence and durability is yet to be improved. A greater intensity of luminescence and a high degree of durability are desired.

SUMMARY OF THE INVENTION

The object of the present invention is to provide the electroluminescent element featuring a greater intensity of luminescence and a high degree of durability.

The organic thin film electroluminescent element of the invention comprises counter electrodes and plural organic compound layers located between the electrodes, and one of the organic compound layers comprises an organic compound represented by formula I.

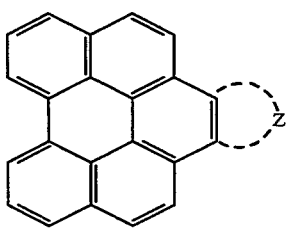

I wherein Z is;

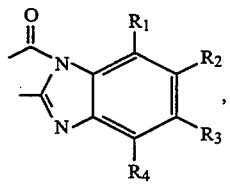 $Z_1$

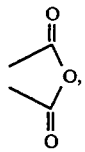 $Z_2$

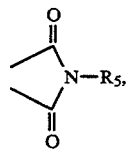 $Z_3$

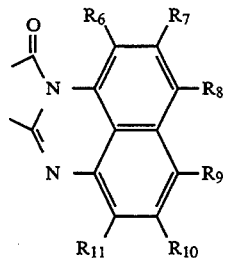 $Z_4$ or

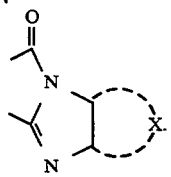 $Z_5$

Preferable example of Z is $Z_4$ and $Z_5$

The preferable embodiment of the present invention is that one of the organic compound layer of the compound comprises the compound represented by formula II.

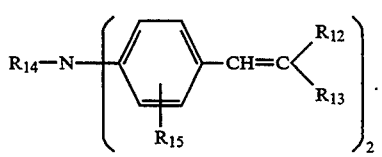

II $R_1$ to $R_{11}$ of $Z_1$ to $Z_4$ independently represent a hydrogen atom, halogen atom, alkyl group With or without substituent, univalent group derived from an unsaturated chain hydrocarbon with or without substituent, heterocyclic compound with or without a substituent, aryl group with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group, or sulfonium group. $R_1$ and $R_2$, $R_2$ and $R_3$, $R_3$ and $R_4$, $R_6$ and $R_7$, $R_7$ and $R_8$, $R_8$ and $R_9$, $R_9$ and $R_{10}$, and $R_{10}$ and $R_{11}$ may combine with each other to form an unsaturated ring structure with or without substituent.

X represents the heterocyclic ring with or without substituent.

The preferable compound represented by formula I is one represented by

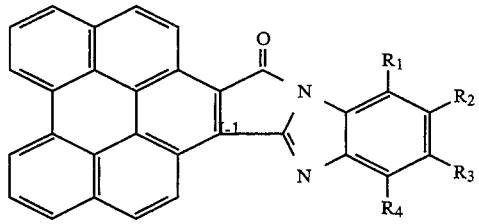

or

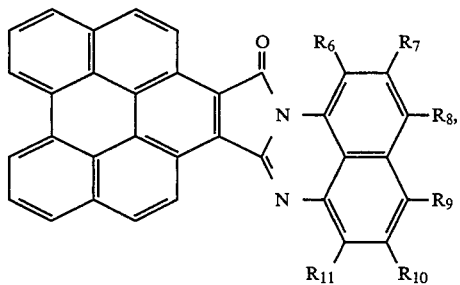

I-4 wherein $R_1$ to $R_4$, and $R_6$ to $R_{11}$ are the same as defined above. The more preferable example of $R_1$ to $R_4$, and $R_6$ to $R_{11}$ are a hydrogen atom, an alkyl group and heterocyclic group.

$R_{12}$ and $R_{13}$ in Formula II independently represent the hydrogen atom, alkyl group with or without substituent, heterocyclic ring group with or without substituent, aryl group with or without substituent, and univalent group derived from the unsaturated chain hydrocarbon with or without substituent. $R_{12}$ and $R_{13}$ are subjected to easy combination and may form a saturated or unsaturated ring structure with or without substituent.

$R_{14}$ represents an alkyl group with or without substituent, aryl group with or without substituent, alkoxy group with or without substituent, or a group of

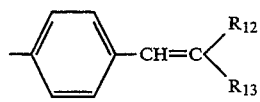

wherein $R_{12}$ and $R_{13}$ are the same as defined above.

$R_{15}$ is a hydrogen atom, or alkyl group, aryl group or alkoxy group each of which may be substituted or not substituted.

The preferable examples of the compound II is

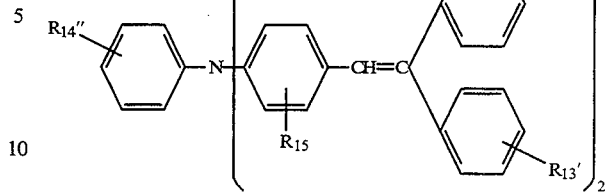

or

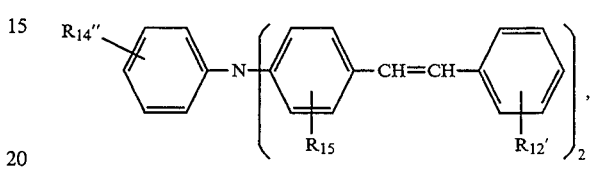

wherein $R_{12}'$ and $R_{13}'$ independently represent the hydrogen atom, alkyl group with or without substituent, heterocyclic ring group with or without substituent, aryl group with or without substituent, and univalent group derived from the unsaturated chain hydrocarbon with or without substituent. $R_{12}'$ and $R_{13}'$ are subjected to easy combination and may form a saturated or unsaturated ring structure with or without substituent, $R_{14}''$ represents an alkyl group with or without substituent, aryl group with or without substituent, alkoxy group with or without substituent, or a group of

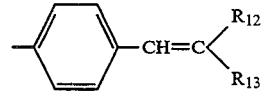

wherein $R_{12}$ and $R_{13}$ are the same as defined above. $R_{15}$ is the same as defined above.

DETAILED DESCRIPTION OF THE INVENTION

Examples of halogen atoms represented by Z-1 to Z-5 and formula II are the chlorine atom, bromine atom, fluorine atom, and iodine atom; examples of the substituted or non-substituted alkyl group include such alkyl groups as the methyl group, ethyl group, propyl group, butyl group and cyclohexyl group; examples of the univalent group derived from the unsaturated chain hydrocarbon are the vinyl group, 1-propenyl group, allyl group, isopropenyl group, 1-butenyl group, 2-butenyl group, 2-pentenyl group and ethynyl group. The examples of the substituted or non-substituted heterocyclic ring include the piperidyl group, piperidino group, pyrrolyl group, furyl group, thienyl group, imidazolyl group, pyrazolyl group, triazolyl group, pyridyl group, thyazoryl group, pyridazinyl group, univalent group consisting of pyridone, morpholinyl group, morpholino group, oxazolyl group, isoxazolyl group, isothiazolyl group, pyrimidinyl group, pyrazinyl group, pyranyl group, benzoimidazolyl group, benzothiazolyl group, benzoxazolyl group, quinolyl group and other heterocyclic ring groups. The examples of the substituted or non-substituted arylgroup include such aryl groups as the phenyl group, naphthyl group, anthonyl group, xylyl group, biphenyl group and phenanthryl group.

The examples of the substituted or non-substituent containing more than two nitrogen atoms are the azo group, phenylazo group, naphthylazo group, hydranizo group, hydrazo group, azoxy group, azido group, diazoamino group, amidino group, ureylene group and guanidino group. Examples of the alkoxyl group include the methoxyl group, ethoxyl group, propoxyl group, butoxyl group, pentyloxyl group and hexyloxyl group. The alkoxy carbonyl group includes the methoxy carbonyl group, ethoxy carbonyl group and butoxy carbonyl group. The amino carbonyl group includes the anilino carbonyl, dimethyl amino carbonyl group, carbamoyl group and alanyl group. The aryloxy carbonyl group includes the naphthyloxyl carbonyl group, xylyloxyl carbonyl group and phenoxy carbonyl group. The acyl group includes the formyl group, acetyl group, propionyl group, butyryl group, valeryl group, palmitoyl group, stearoyl group, oleoyl group, benzoyl group, trioyl group, salicyloyl group, cinnamoyl group, naphthoyl group, phthaloyl group, oxalyl group, malonyl group, succinyl group and furoyl group. The aryloxyl group includes the phenoxy group and tolyloxy group. The aralkyl group contains the benzil group and phenethyl group. The acyl amino group includes the acetyl amino group, propionyl amino group and butyryl amino group. The acyloxyl group includes the acetyloxy group, propionyloxy group and butyryloxy group.

Said substituent represents the hydrogen atom, halogen atom, such alkyl groups as the methyl group, ethyl group, propyl group, butyl group and cyclohexyl group; the vinyl group, 1-propenyl group, allyl group, such univalent groups derived from the unsaturated chain hydrocarbon as the isopropenyl group, 1-butenyl group, 2-butenyl group and 2-pentenyl group; univalent groups comprising the piperidyl group, piperidino group, pyrrolyl group, furyl group, thienyl group, imidazolyl group, pyrazolyl group, triazolyl group, pyridyl group, thiazolyl group, pyridazinyl group and pyridone group; such heterocyclic groups as the morpholinyl group, morpholino group, oxazolyl group, isoxazolyl group, isothiazolyl group, pyrimidinyl group, pyrazinyl group, pyranyl group, benzimidazolyl group, benzothiazolyl group, benzoxazolyl group and quinolyl group; such aryl groups as the phenyl group, naphtyl group, anthonyl group, xylyl group, biphenyl group and phenanthryl group; such groups having two or more nitrogen atoms as the azo group, phenylazo group, naphthylazo group, hydranizo group, hydrazo group, azoxy group, azido group, diazoamino group, amidino group, ureylene group and guanidino group; such alkoxyl groups as the styryl group, anisyl group, amino group, alkylamino group, dialkylamino group, methoxyl group, ethoxyl group, propoxyl group, butoxyl group, pentyloxyl group and hexyloxyl group; such alkoxy carbonyl groups as the methoxy carbonyl group, ethoxy carbonyl group and butoxy carbonyl group; such aminocarbonyl groups as the anilino carbonyl group, dimethyl amino carbonyl group, carbamoyl group and alanyl group; such aryloxy carbonyl groups as the naphthyloxy carbonyl group, xylyloxy carbonyl group and phenoxy carbonyl group; such acyl groups as the carboxyl group, formyl group, acetyl group, propionyl group, butyryl group, valeryl group, group, stearoyl group, oleoyl group, benzoyl group, cinnamoyl group, naphthoyl group, phthaloyl group, oxalyl group, malonyl group, succinyl group and furoyl group; such aryloxy groups as the phenoxy group and tolyloxy group; such aralkyl groups as the benzyl group and phenethyl group; such acyl amino groups as the acetyl amino group, propionyl amino group and butyryl amino group; such acyloxyl groups as the acetyloxy group, propionyloxy group, butyryloxy group and acyloxy group; the hydroxyl group, nitro group, and sulfo group or sulfonium group.

The following shows the examples of the organic compounds represented by Formula I:

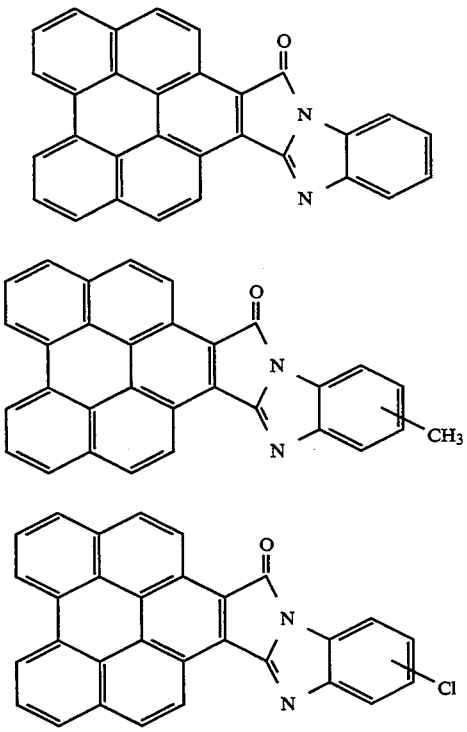

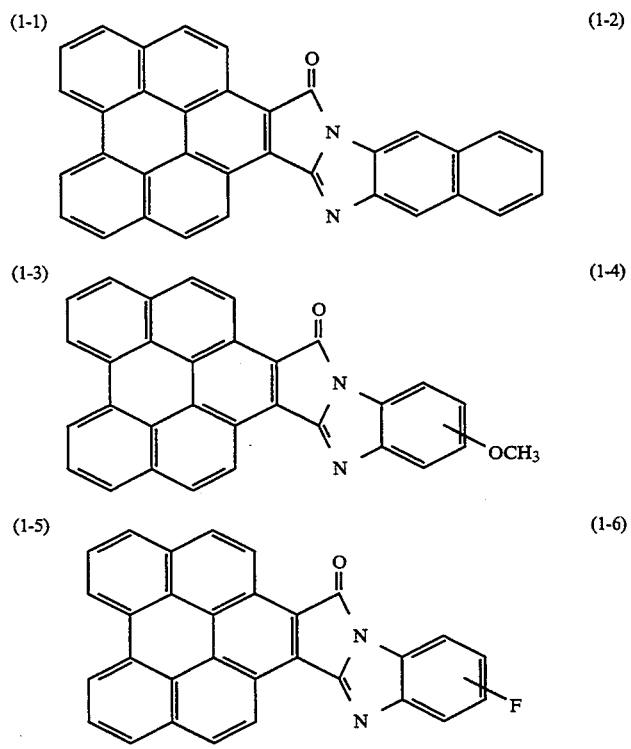

-continued
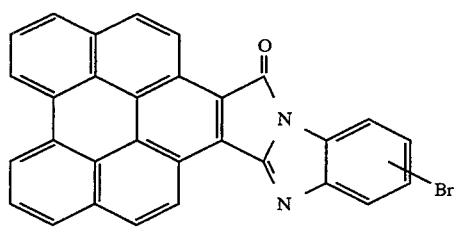 (1-7)
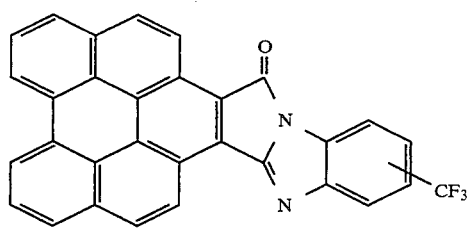 (1-8)
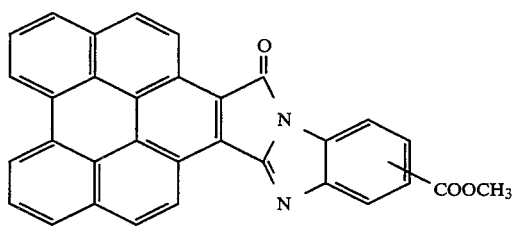 (1-9)
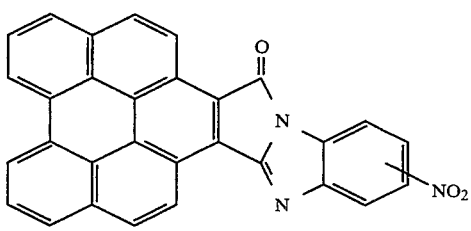 (1-10)
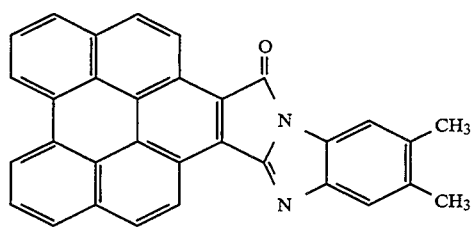 (1-11)
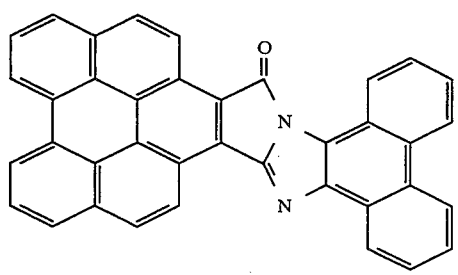 (1-12)
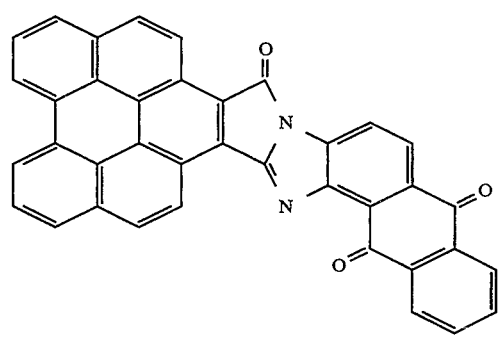 (1-13)
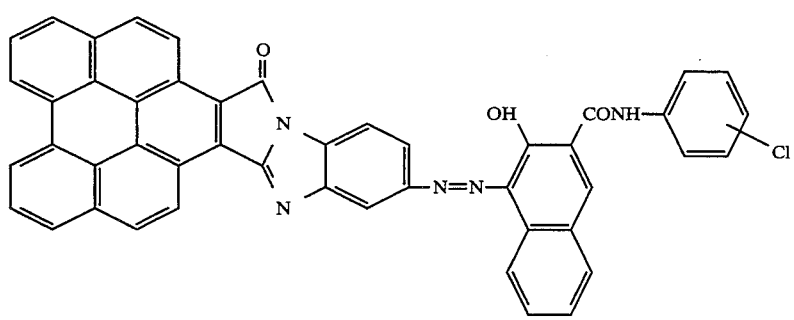 (1-14)

-continued
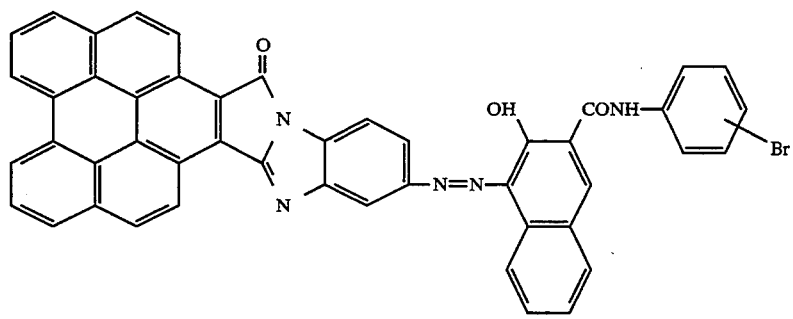
(1-15)
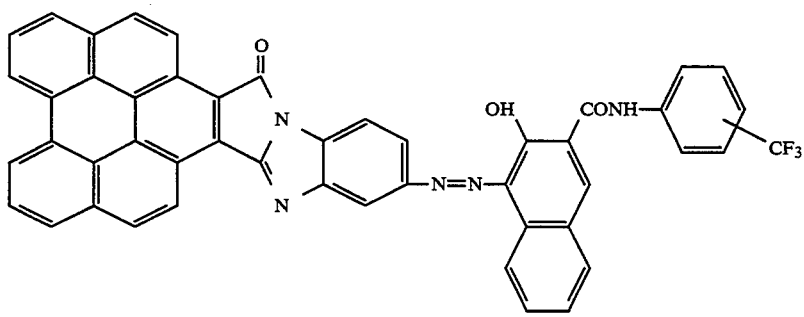
(1-16)
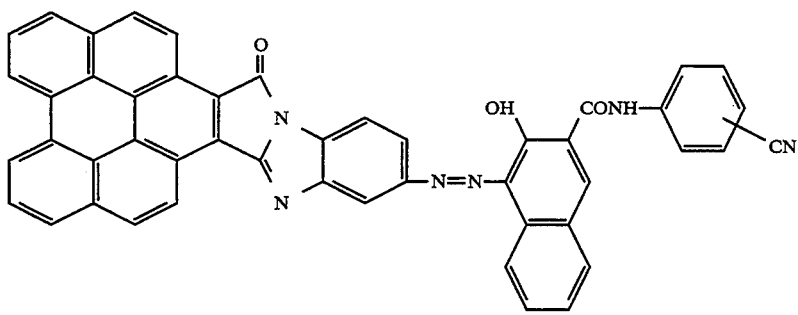
(1-17)
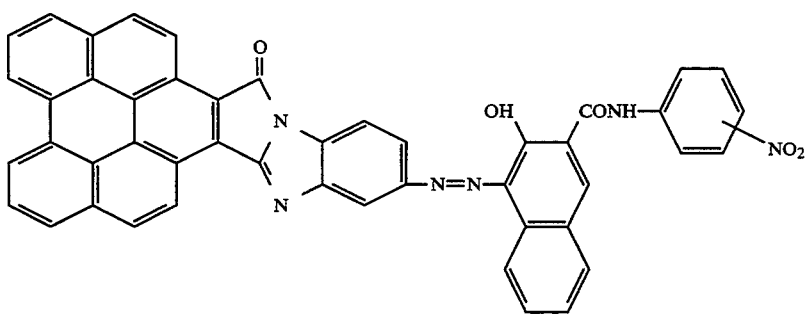
(1-18)
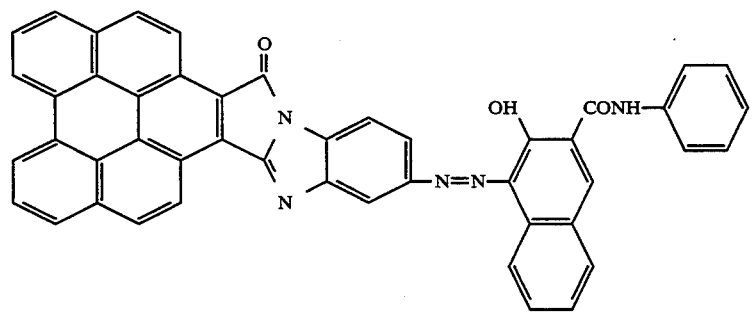
(1-19)

-continued
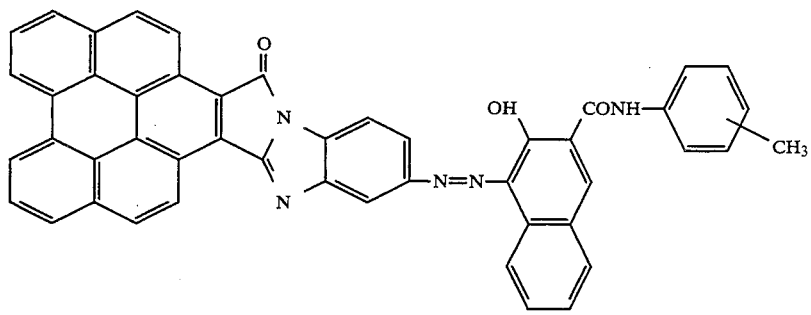
(1-20)
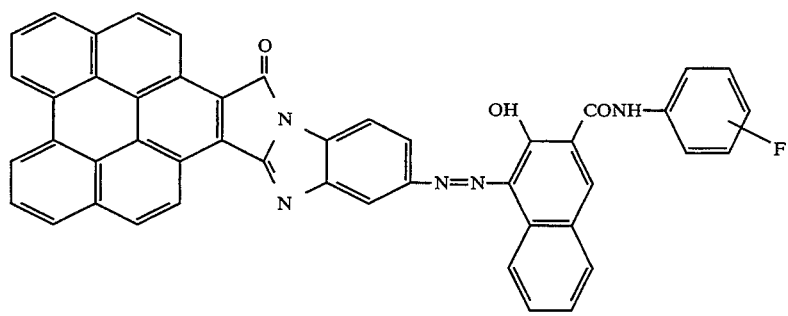
(1-21)
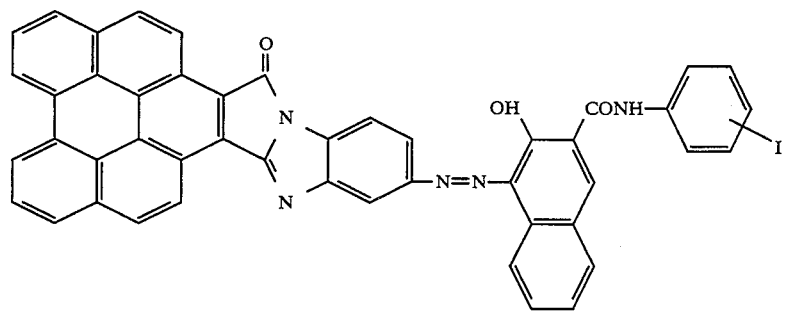
(1-22)
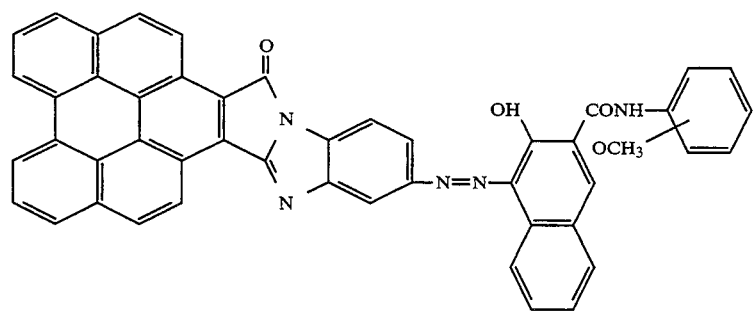
(1-23)
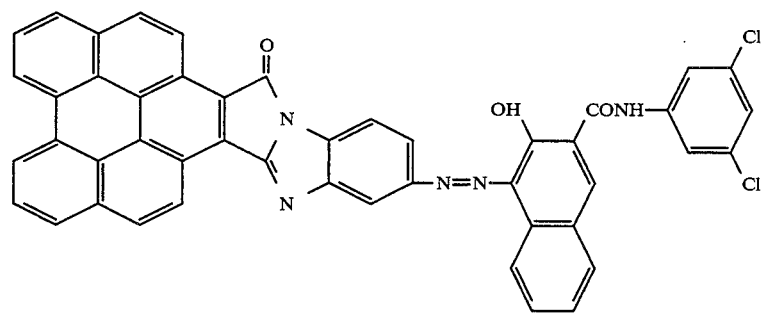
(1-24)

-continued
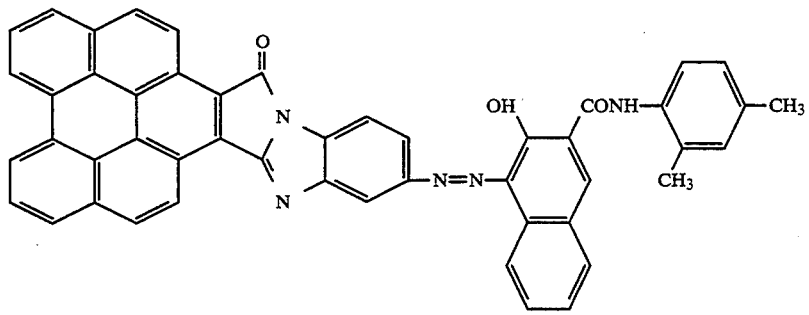 (1-25)
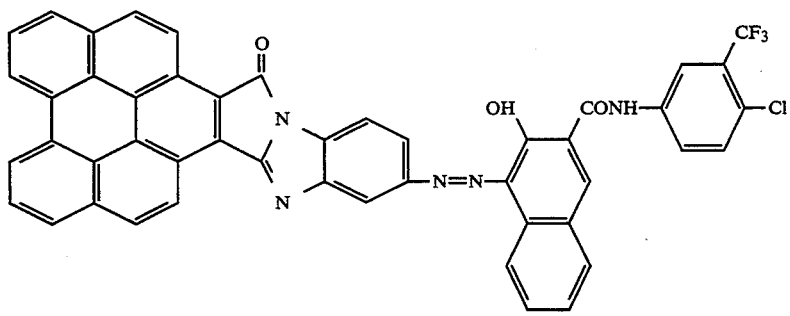 (1-26)
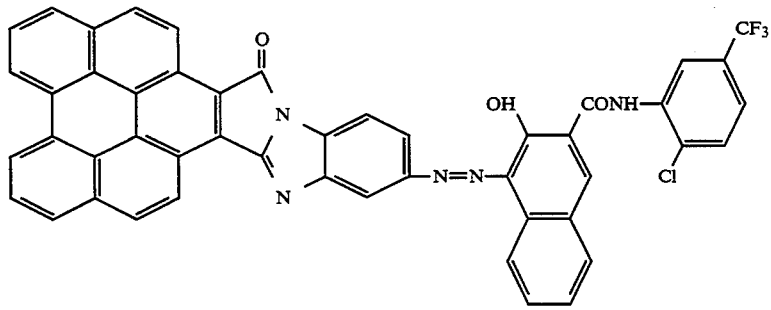 (1-27)
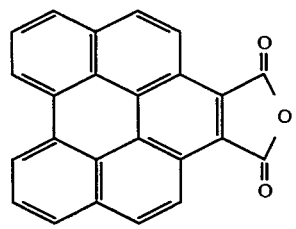 (2-1)
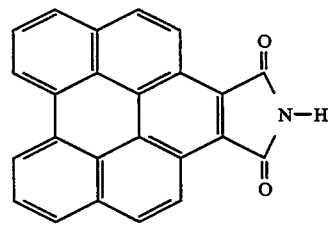 (3-1)
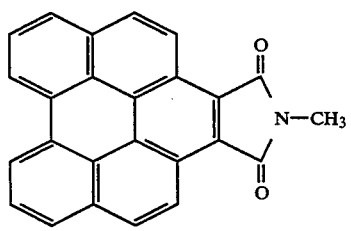 (3-2)
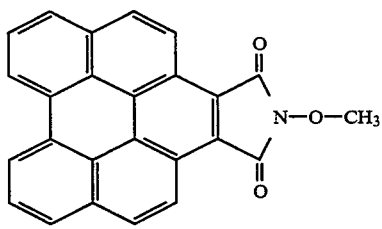 (3-3)

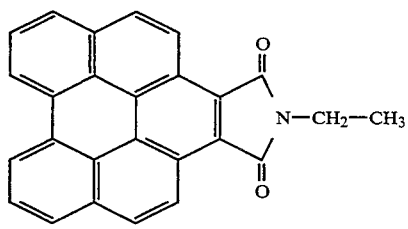
(3-4)
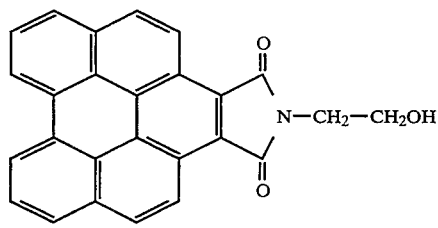
(3-5)
(3-6)
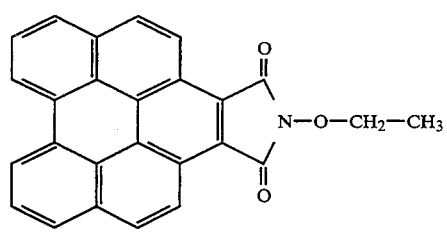
(3-7)
(3-8)
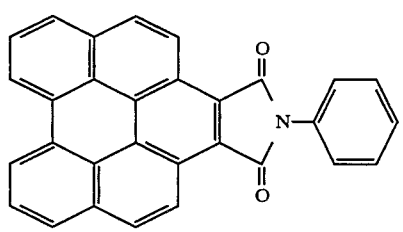
(3-9)
(3-10)
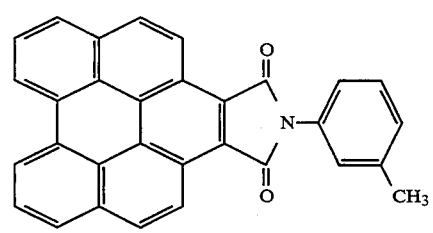
(3-11)
(3-12)
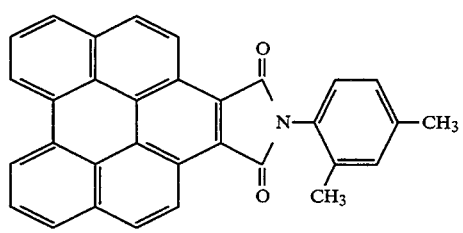
(3-13)
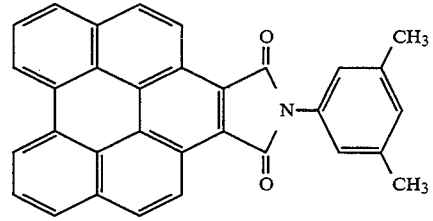
(3-14)

-continued
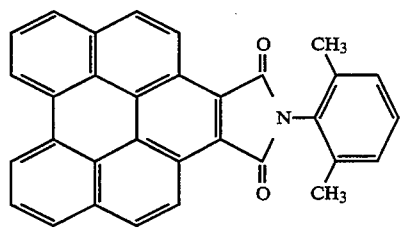
(3-15)
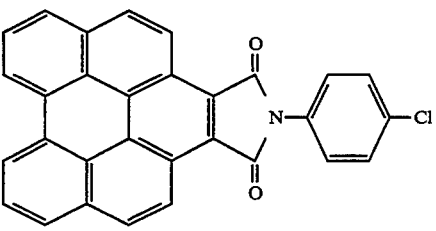
(3-16)
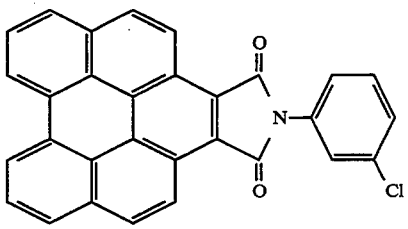
(3-17)
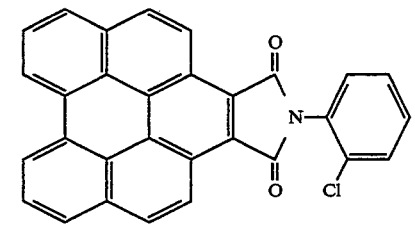
(3-18)
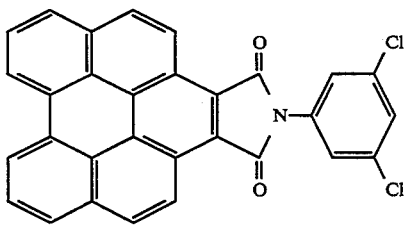
(3-19)
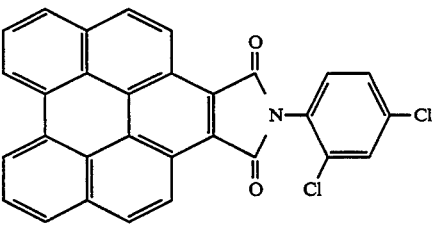
(3-20)
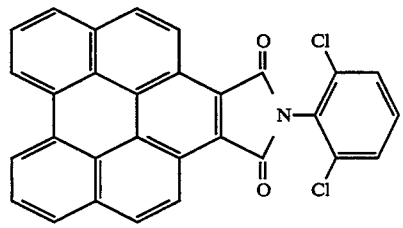
(3-21)
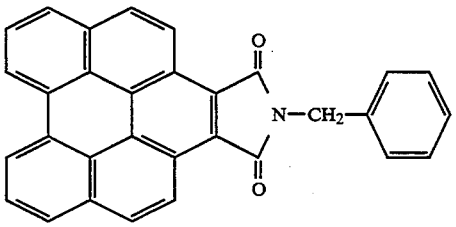
(3-22)
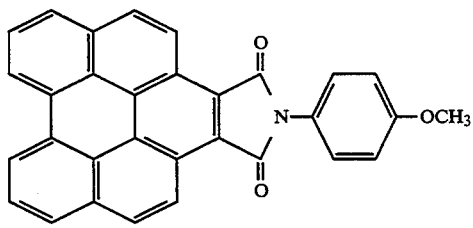
(3-23)
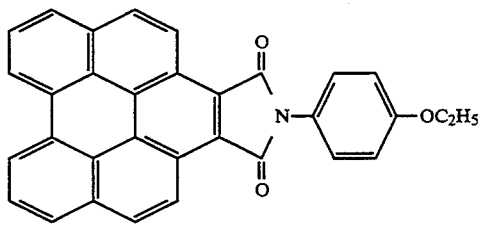
(3-24)
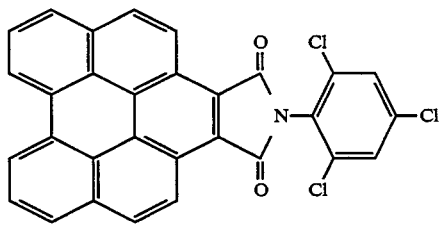
(3-25)
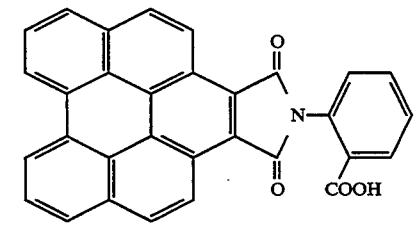
(3-26)
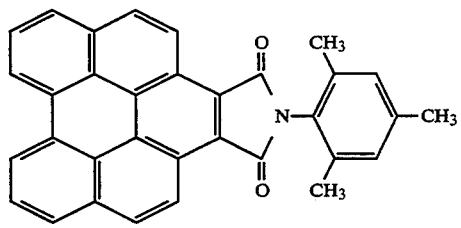
(3-27)
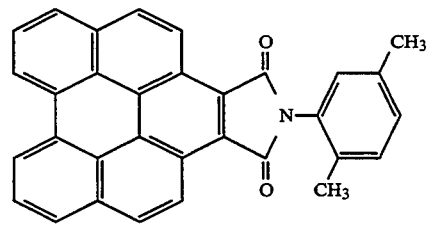
(3-28)

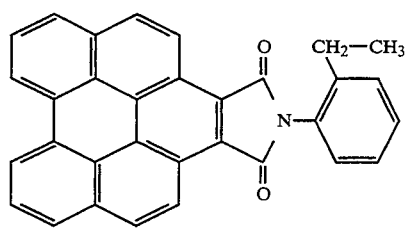 (3-29)
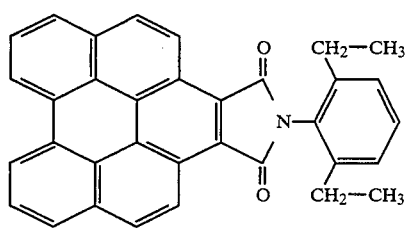 (3-30)
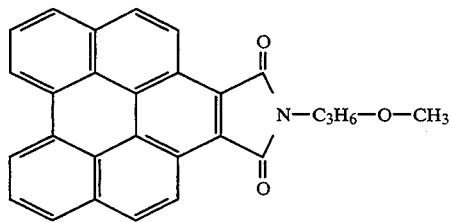 (3-31)
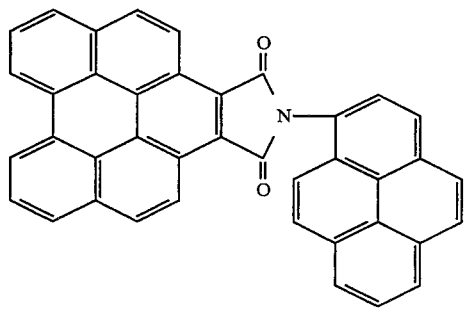 (3-32)
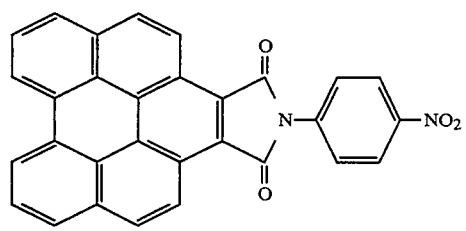 (3-33)
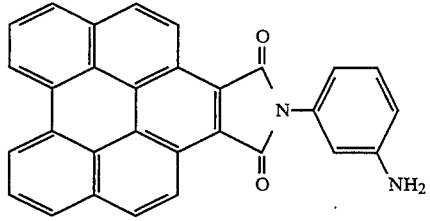 (3-34)
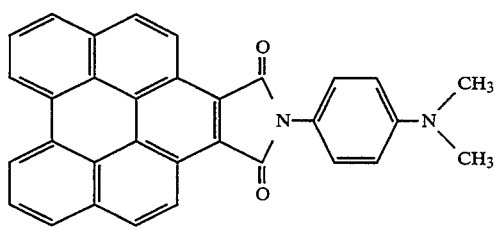 (3-35)
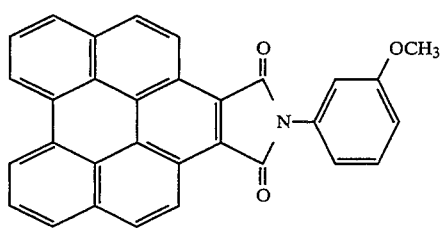 (3-36)
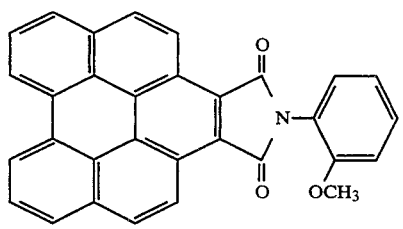 (3-37)
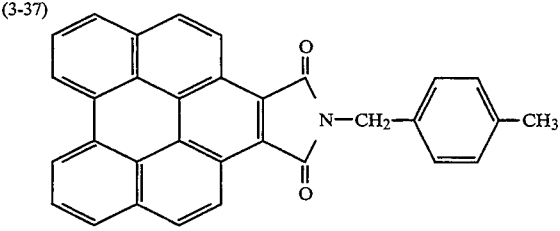 (3-38)
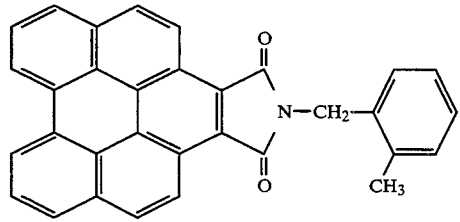 (3-39)
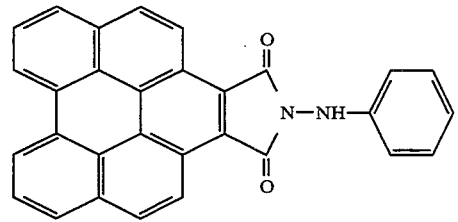 (3-40)

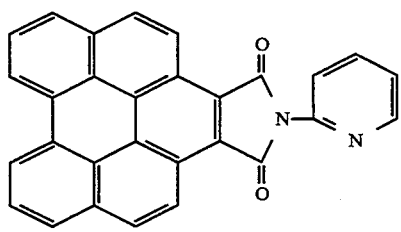 (3-41)
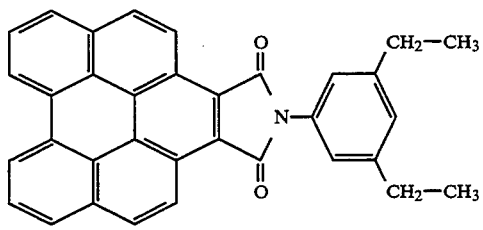 (3-42)
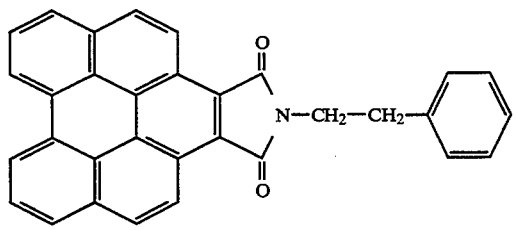 (3-43)
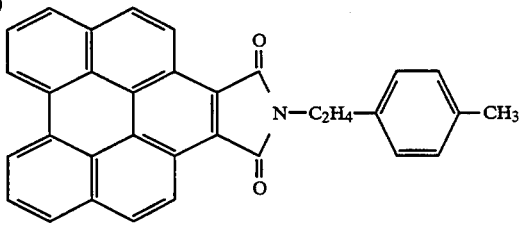 (3-44)
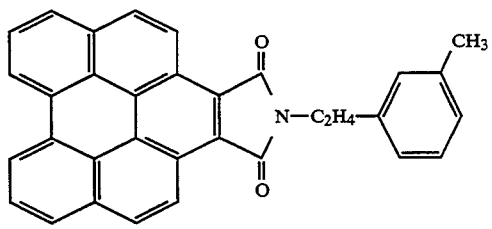 (3-45)
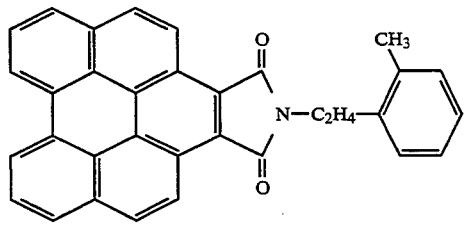 (3-46)
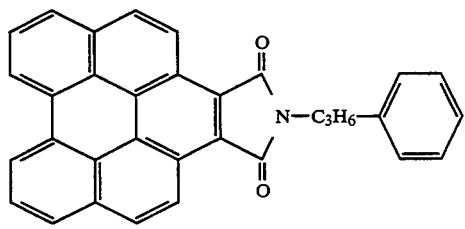 (3-47)
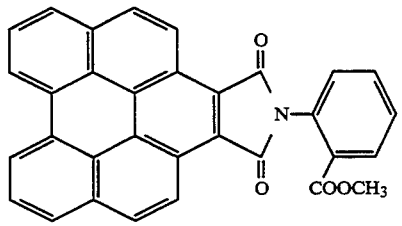 (3-48)
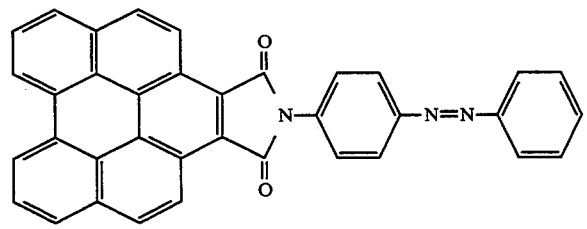 (3-49)
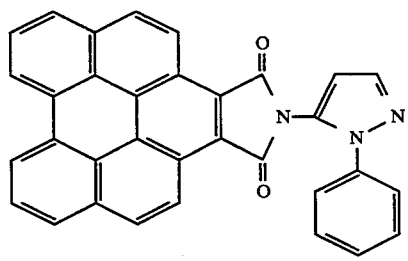 (3-50)
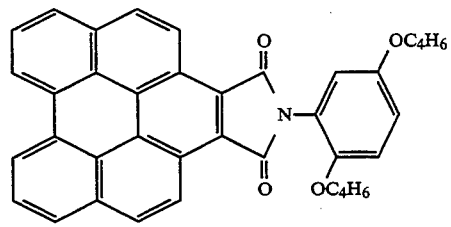 (3-51)

-continued
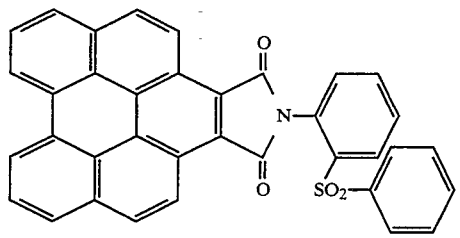 (3-52)
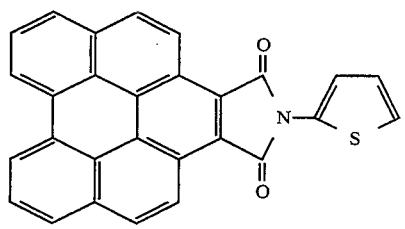 (3-53)
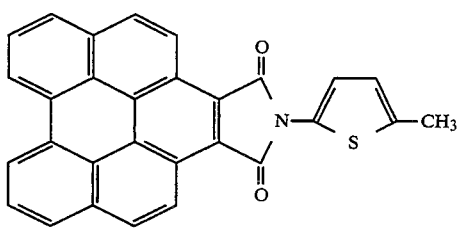 (3-54)
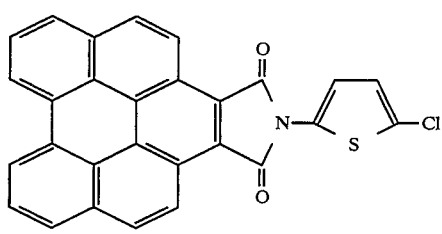 (3-55)
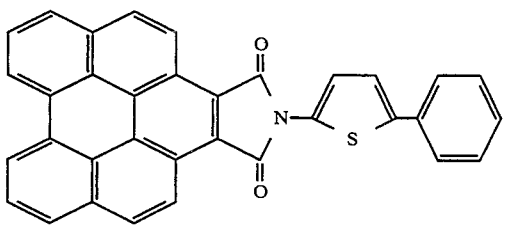 (3-56)
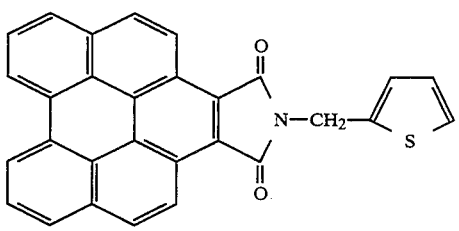 (3-57)
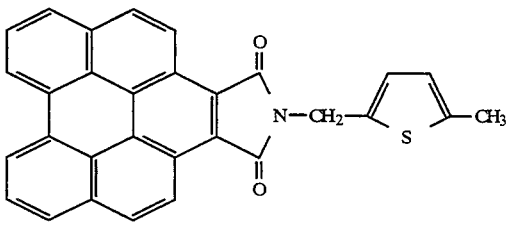 (3-58)
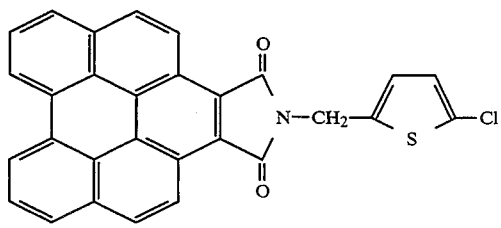 (3-59)
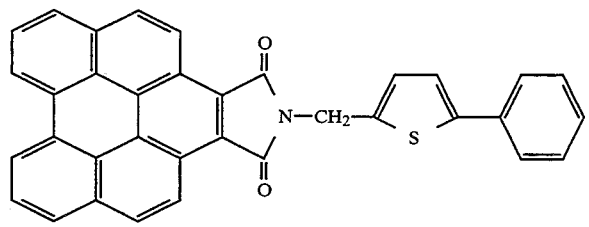 (3-60)
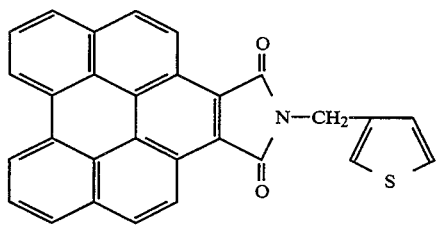 (3-61)
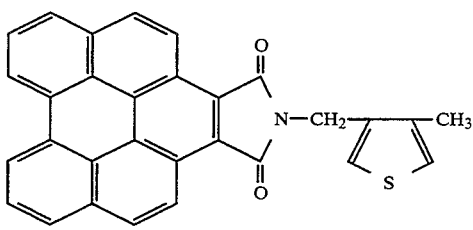 (3-62)

-continued
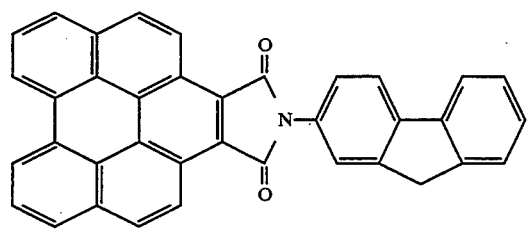
(3-63)
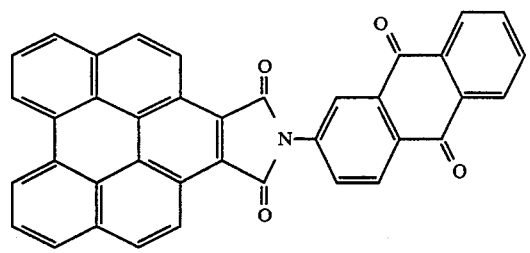
(3-64)
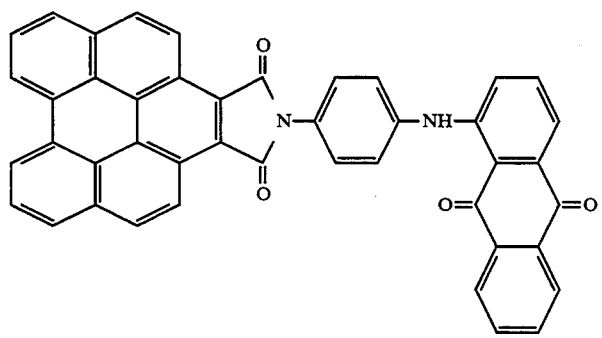
(3-65)
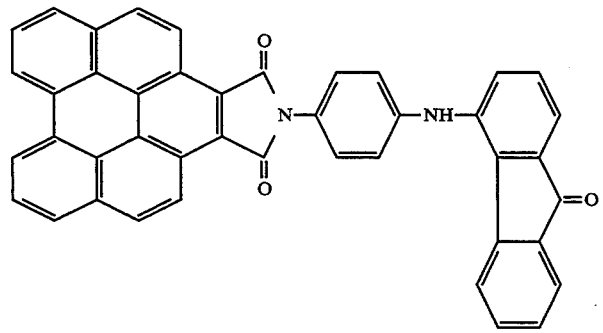
(3-66)
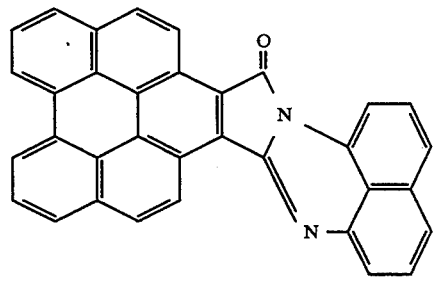
(4-1)
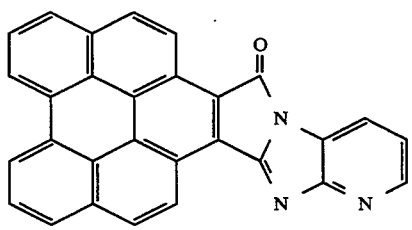
(5-1)

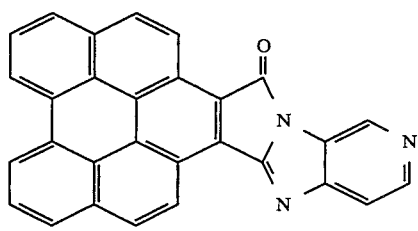
(5-2)
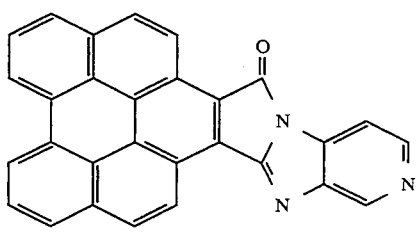
(5-3)
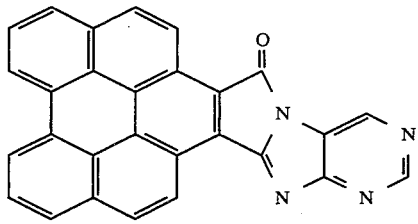
(5-4)
Compounds of II are exemplified.
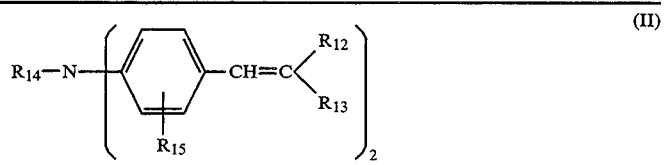
(II)
| Compound No. | $R_{15}$ | $R_{14}$ | $R_{13}$ | $R_{12}$ |
|---|---|---|---|---|
| II-1 | H | CH$_3$ | H | phenyl |
| II-2 | H | CH$_3$ | H | naphthyl |
| II-3 | H | CH$_3$ | H | anthryl |
| II-4 | H | CH$_3$ | CH$_3$ | phenyl |
| II-5 | H | C$_2$H$_5$ | H | phenyl |
| II-6 | H | C$_3$H$_7$(n) | H | phenyl |
| II-7 | H | CH$_3$ | phenyl | phenyl |

-continued
| | | | | |
|---|---|---|---|---|
| II-8 | H | CH₃ | H | 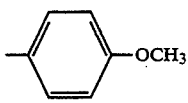 |
| II-9 | H | 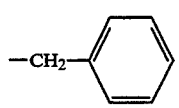 | H | 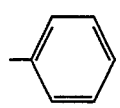 |
| II-10 | H | 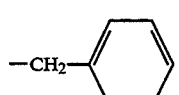 | 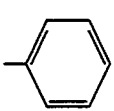 | 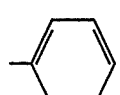 |
| II-11 | H | 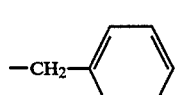 | H | 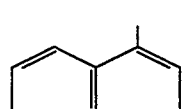 |
| II-12 | H | 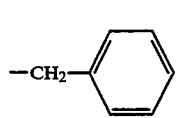 | H | 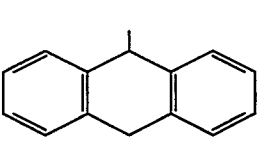 |
| II-13 | H | 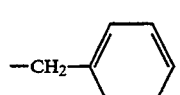 | H | 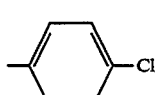 |
| II-14 | H | 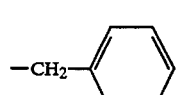 | H | 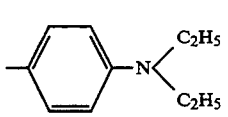 |
| II-15 | H | 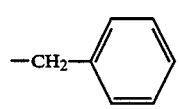 | H | 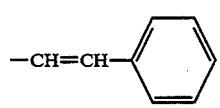 |
| II-16 | H | 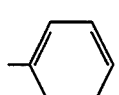 | H | 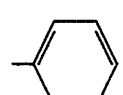 |
| II-17 | H | 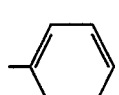 | H | 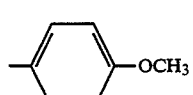 |
| II-18 | H | 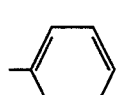 | H | 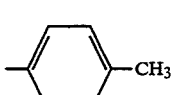 |
| II-19 | H | 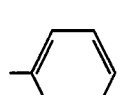 | H | 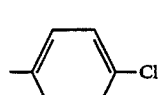 |
| II-20 | H | 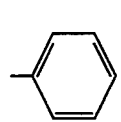 | H | 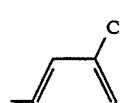 |

-continued
| | | | | |
|---|---|---|---|---|
| II-21 | H |  | H | 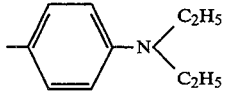 |
| II-22 | H | 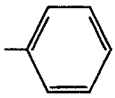 | H | 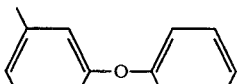 |
| II-23 | H | 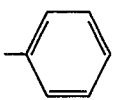 | H | 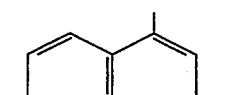 |
| II-24 | H | 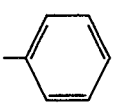 | H | 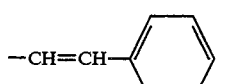 |
| II-25 | H | 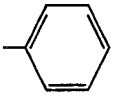 | H | 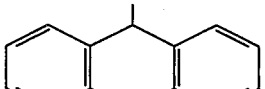 |
| II-26 | H | 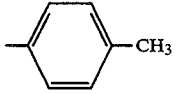 | H | 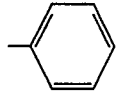 |
| II-27 | H | 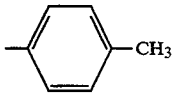 | H | 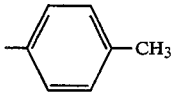 |
| II-28 | H | 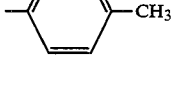 | H | 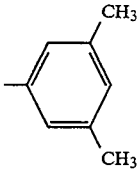 |
| II-29 | H | 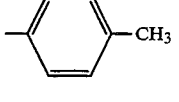 | H | 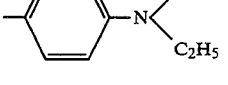 |
| II-30 | H |  | H | 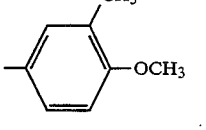 |
| II-31 | H | 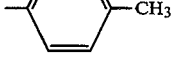 | H | 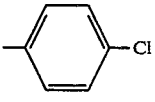 |
| II-32 | H |  | H | 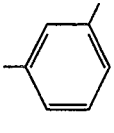 |

| | | | | |
|---|---|---|---|---|
| II-33 | H | 4-methylphenyl | H | 2-chlorophenyl |
| II-34 | H | 4-methylphenyl | H | 3,4-dichlorophenyl |
| II-35 | H | 4-methylphenyl | H | 4-iodophenyl |
| II-36 | H | 4-methylphenyl | H | 3-(trifluoromethyl)phenyl |
| II-37 | H | 4-methylphenyl | H | 4-ethylphenyl |
| II-38 | H | 4-methoxyphenyl | H | phenyl |
| II-39 | H | 4-methoxyphenyl | H | 4-methoxyphenyl |
| II-40 | H | 4-methoxyphenyl | H | 2-chlorophenyl |
| II-41 | H | 4-methoxyphenyl | H | 4-(N,N-diethylamino)phenyl |
| II-42 | H | 2,5-dimethylphenyl | H | phenyl |
| II-43 | H | 2,5-dimethylphenyl | H | 3,5-dimethylphenyl |

-continued

| | | | | |
|---|---|---|---|---|
| II-44 | H | 2,4,5-trimethylphenyl | H | 3,5-dimethylphenyl |
| II-45 | H | 4-cyanophenyl | H | phenyl |
| II-46 | H | 4-chlorophenyl | H | phenyl |
| II-47 | H | phenyl | H | 4-ethylphenyl |
| II-48 | H | phenyl | H | 4-ethoxyphenyl |
| II-49 | H | phenyl | CH₃ | phenyl |
| II-50 | H | phenyl | —CH₂—phenyl | phenyl |
| II-51 | H | phenyl | phenyl | phenyl |
| II-52 | H | phenyl | phenyl | 4-methylphenyl |
| II-53 | H | phenyl | phenyl | 4-methoxyphenyl |
| II-54 | H | phenyl | phenyl | 2-naphthyl |
| II-55 | H | phenyl | 4-methylphenyl | 4-methylphenyl |
| II-56 | H | 4-methylphenyl | phenyl | phenyl |

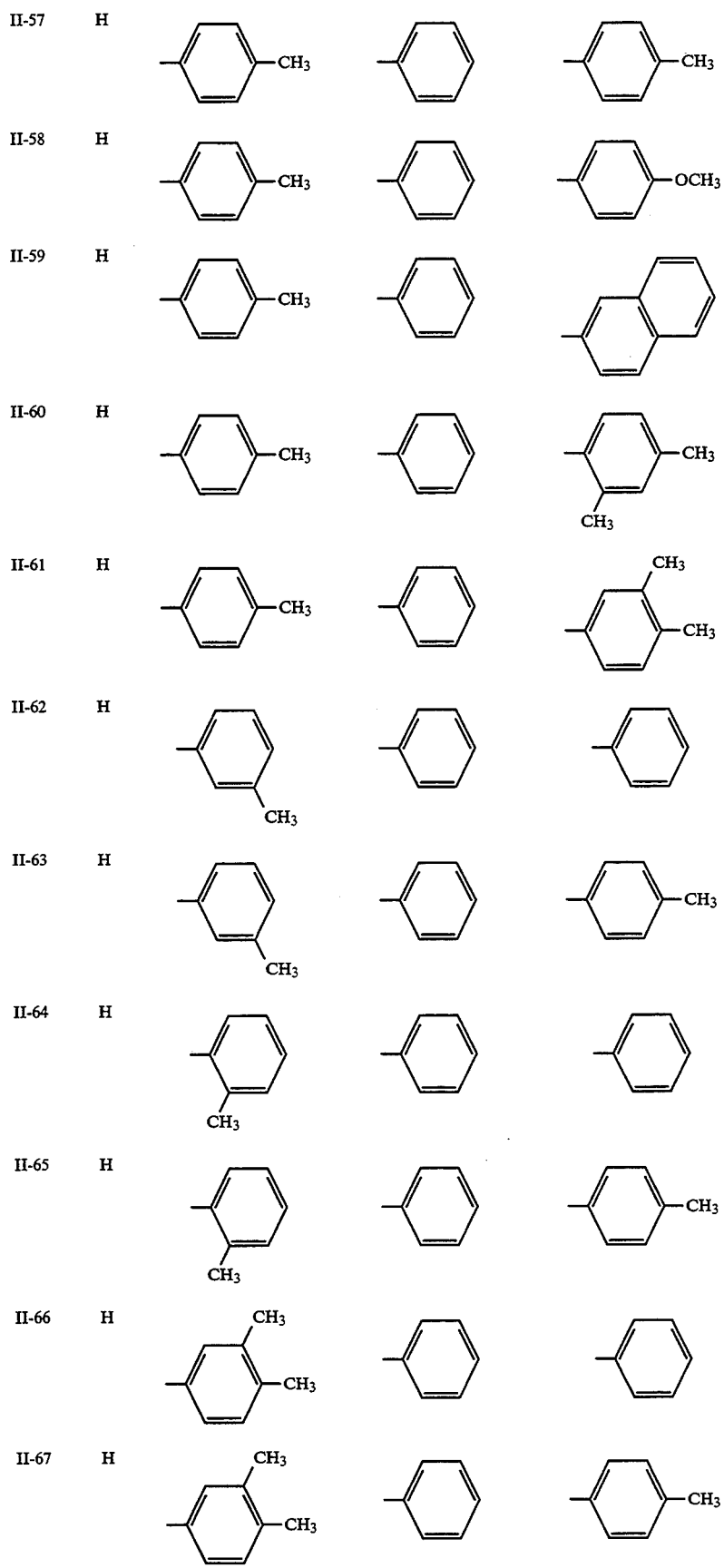

-continued
| | | | | |
|---|---|---|---|---|
| II-68 | H | 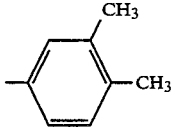 | 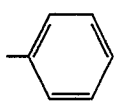 | 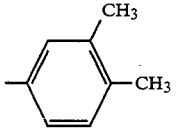 |
| II-69 | H | 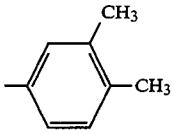 | 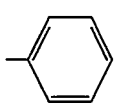 | 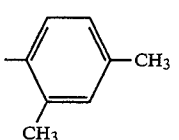 |
| II-70 | H | 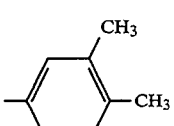 | 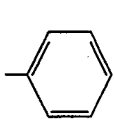 | 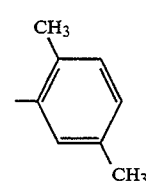 |
| II-71 | H | 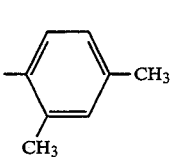 | 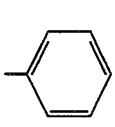 | 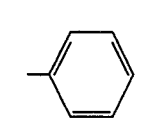 |
| II-72 | H | 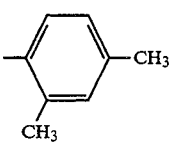 | 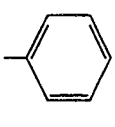 | 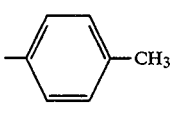 |
| II-73 | H | 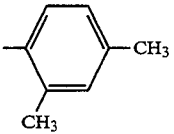 | 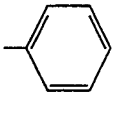 | 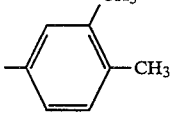 |
| II-74 | H | 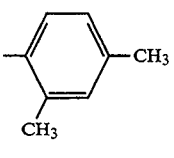 | 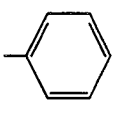 | 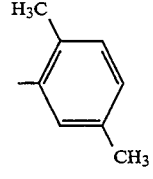 |
| II-75 | H | 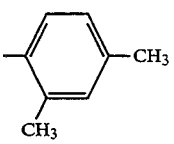 | 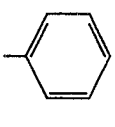 | 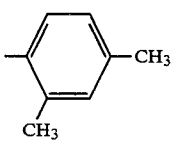 |
| II-76 | H | 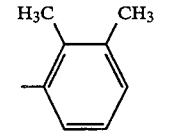 | 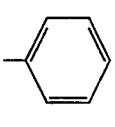 | 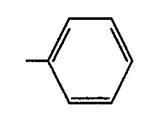 |
| II-77 | H | 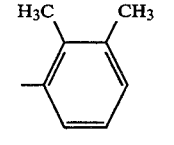 | 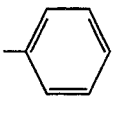 | 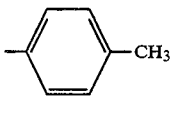 |

| | | | | |
|---|---|---|---|---|
| II-78 | H | 2,3-dimethylphenyl | phenyl | 2,4-dimethylphenyl (3,4-) |
| II-79 | H | 2,3-dimethylphenyl | phenyl | 3,4-dimethylphenyl |
| II-80 | H | 2,3-dimethylphenyl | phenyl | 2,5-dimethylphenyl |
| II-81 | H | 2,4,6-trimethylphenyl | phenyl | phenyl |
| II-82 | H | 2,4,6-trimethylphenyl | phenyl | 4-methylphenyl |
| II-83 | H | 2,4,6-trimethylphenyl | phenyl | 3,4-dimethylphenyl |
| II-84 | H | 2,4,6-trimethylphenyl | phenyl | 3,4-dimethylphenyl |
| II-85 | H | 2,4,6-trimethylphenyl | phenyl | 2,5-dimethylphenyl |
| II-86 | H | 4-ethylphenyl | phenyl | phenyl |
| II-87 | H | 4-ethylphenyl | phenyl | 4-methylphenyl |

-continued

| | | | | |
|---|---|---|---|---|
| II-88 | H | 4-C₂H₅-C₆H₄- | C₆H₅- | 3,4-(CH₃)₂-C₆H₃- |
| II-89 | H | 4-C₂H₅-C₆H₄- | C₆H₅- | 2,4-(CH₃)₂-C₆H₃- |
| II-90 | H | 4-C₂H₅-C₆H₄- | C₆H₅- | 2,5-(CH₃)₂-C₆H₃- |
| II-91 | H | 4-OCH₃-C₆H₄- | C₆H₅- | C₆H₅- |
| II-92 | H | 3-OCH₃-C₆H₄- | C₆H₅- | C₆H₅- |
| II-93 | H | 3-OCH₃-C₆H₄- | C₆H₅- | 4-CH₃-C₆H₄- |
| II-94 | H | 2-OCH₃-C₆H₄- | C₆H₅- | C₆H₅- |
| II-95 | H | 2-OCH₃-C₆H₄- | C₆H₅- | 4-CH₃-C₆H₄- |
| II-96 | H | 4-OCH₃-C₆H₄- | C₆H₅- | 4-OCH₃-C₆H₄- |
| II-97 | H | 4-OCH₃-C₆H₄- | C₆H₅- | 2-naphthyl |
| II-98 | H | 4-OCH₃-C₆H₄- | C₆H₅- | 4-Cl-C₆H₄- |

-continued

| | | | | |
|---|---|---|---|---|
| II-99 | H | 4-Cl-C₆H₄— | C₆H₅— | C₆H₅— |
| II-100 | H | 4-CN-C₆H₄— | C₆H₅— | C₆H₅— |
| II-101 | H | 3-Cl-4-CH₃-C₆H₃— | C₆H₅— | C₆H₅— |
| II-102 | H | 2-CH₃-6-F-C₆H₃— | C₆H₅— | C₆H₅— |
| II-103 | H | 2-OCH₃-5-Cl-C₆H₃— | C₆H₅— | C₆H₅— |
| II-104 | H | 4-CH₃-C₆H₄— | 4-CH₃-C₆H₄— | 4-CH₃-C₆H₄— |
| II-105 | H | 4-OCH₃-C₆H₄— | 4-CH₃-C₆H₄— | 4-CH₃-C₆H₄— |
| II-106 | H | 3,4-(CH₃)₂-C₆H₃— | 4-CH₃-C₆H₄— | 4-CH₃-C₆H₄— |
| II-107 | H | 3,4,5-(CH₃)₃-C₆H₂— | 4-CH₃-C₆H₄— | 4-CH₃-C₆H₄— |
| II-108 | H | 4-N(C₂H₅)₂-C₆H₄— | H | C₆H₅— |
| II-109 | H | 4-N(C₂H₅)₂-C₆H₄— | C₆H₅— | C₆H₅— |

II-110

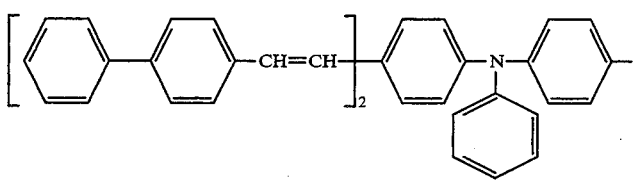
II-111
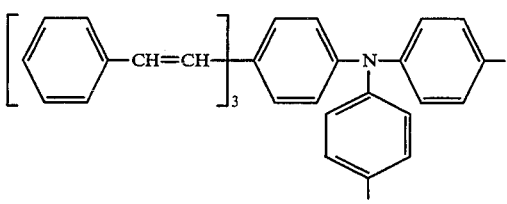
II-112
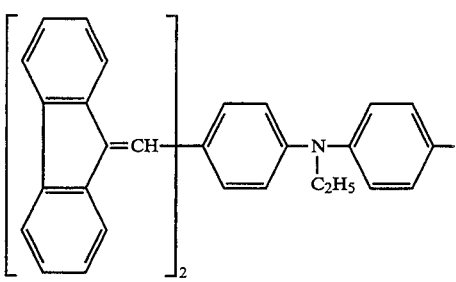
II-113
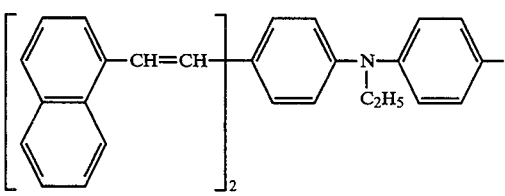
II-114
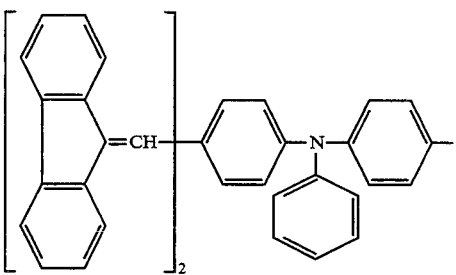
II-115
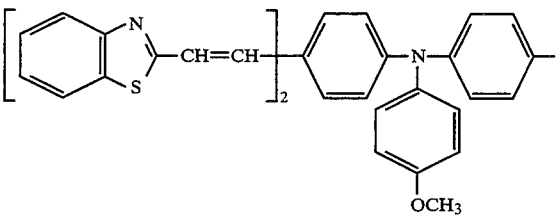
II-116
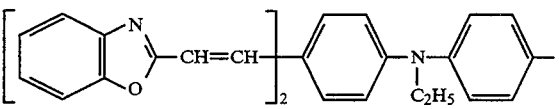

II-117

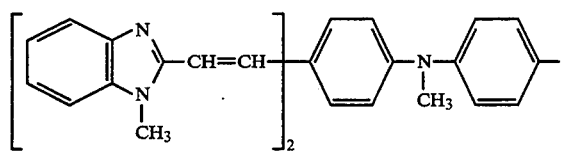

II-118

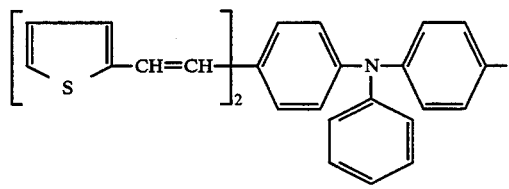

II-119

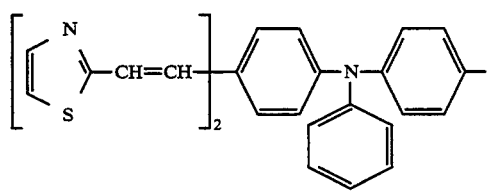

II-120

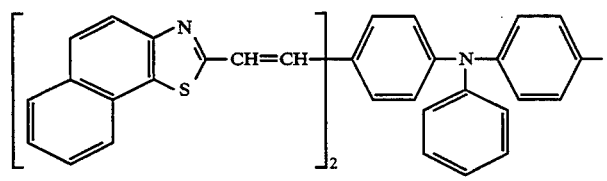

II-121

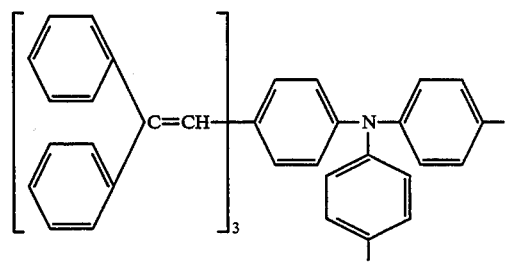

II-122

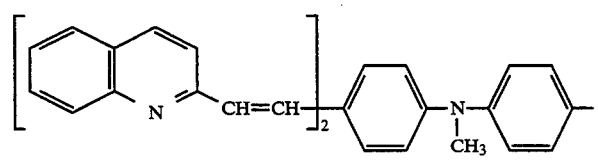

The present invention of the organic compound represented by Formula I may be easily synthesized according to the known method (described in J. Chem. Soc., 1957, 4616, etc.).

Synthesis Example 1

Sufficiently crushed and mixed chloranil (21 grams; mp 287° C.), maleic anhydride (150 grams; mp 55.5° C.) and perylene (10 grams; mp 280° C.) were put into a three-neck flask fitted with the mixer, reflux cooling water and dropping funnel, and were mixed for ten minutes at the boiling point while being heated. After that, xylene (200 ml) heated from the dropping funnel was added, and mixed for one hour, and was subjected to thermal filtration. The needle crystal separated by thermal filtration was rinsed by xylene and was further cleaned by ether, thereby the red brown needle crystal was obtained. The red brown needle crystal was subjected to half-sublimation for four hours using the pressure reducing sublimation device at the temperature of 300° C. at $10^{-4}$ mmHg. The sublimed residual was further treated for six hours using the pressure reducing sublimation device at the temperature of 400° C. at $10^{-4}$ mmHg, thereby the lustrous red brown needle crystal (2-1) was obtained.

Synthesis Example 2

Compound (1-1) can be synthesized by subjecting the ophenylendiamine to condensation reaction with the (2-1) synthesized according to the Example of Synthesis 1, in the independent or mixed solution containing the non-reactive solution, preferably, such aprotic solvent as N-methyl pyrolidone and N,N-dimethyl formaldehyde, such basic solvent as quinoline, and such chloric solution as o-dichlorobenzene, under the temperature condition of over the temperature or preferably between 150° and 250° C.

Synthesis Example 3

Compound (1-2) can be synthesized by subjecting the 2,3-diamino naphthalene to condensation reaction with the (2-1) synthesized according to the Example of Synthesis 1, in the independent or mixed solution containing the non-reactive solution, preferably, such aprotic solvent as N-methyl pyrolidone and N,N-dimethyl formaldehyde, such basic solvent as quinoline, and such chloric solution as o-dichlorobenzene, under the temperature condition of over the temperature or preferably between 150° and 250° C.

Synthesis Example 4

Compound (3-9) can be synthesized by subjecting the aniline to condensation reaction with the (2-1) synthesized according to the Example of Synthesis 1, in the independent or mixed solution containing the non-reactive solution, preferably, such aprotic solvent as N-methyl pyrolidone and N,N-dimethyl formaldehyde, such basic solvent as quinoline, and such chloric solution as o-dichlorobenzene, under the temperature condition of over the temperature or preferably between 150° and 250° C.

Synthesis Example 5

Compound (4-1) can be synthesized by subjecting the 1,8-diamino naphthalene to condensation reaction with the (2-1) synthesized according to the Example of Synthesis 1, in the independent or mixed solution containing the non-reactive solution, preferably, such aprotic solvent as N-methyl pyrolidone and N,N-dimethyl formaldehyde, such basic solvent as quinoline, and such chloric solution as o-dichlorobenzene, under the temperature condition of over the temperature or preferably between 150° and 250° C.

The present invention also allows easy production of the styryl compound represented by II according to the method known method.

The styryl compound can be obtained, for example, by reaction between the phosphor compound represented by Formula III and the diformyl compound represented by Formula IV.

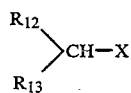

III

-continued

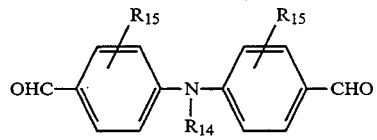

IV $R_{12}$ and $R_{13}$ in Formula III are synonymous with $R_{12}$ and $R_{13}$ in Formula II, X representing the triphenyl phosphonium group or trialkyl phosphonium group represented by $-P^+ -(R_{16})_3 Y-$, or the dialkyl phosphite group represented by $-PO(OR_{17})_2$. $R_{16}$ denotes the alkyl group and aryl group, Y the halogen, and $R_{17}$ the alkyl group.

$R_{14}$ and $R_{15}$ in Formula IV are synonymous with $R_{14}$ and $R_{15}$ in Formula II.

According to the present invention, the phosphor compound can be easily prepare by heating the corresponding halomethyl compound and triaryl phosphine, trialkyl phosphine or trialkyl phosphite directly or in the toluene and xylene solvent.

As the reactive solvent in the synthesis process of styryl compound, the following inert solvents are preferred; carbon hydrides, alcohols and ethers, including methanol, ethanol, isopropanol, butanol, 2-methoxyethanol, 1,2-dimethoxy ethane, bis(2-methoxyethyl) ether, dioxan, tetrahydrafuran, toluene, xylene, dimethylsulfoxide, N,N-dimethylformamide, N-methylpyrolidone and 1,3-dimethyl-2-imidazolidinone. Polar solvents such as N, N-dimethylformamide and dimethylsulfoxide are especially preferred among others.

As the condensation agent such alcoholates as caustic soda, caustic potash, sodium amido sodium hydride, sodium methylate and potassium-t-butoxide are preferred. The reactive temperature can be selected within the range between 0° and 100° C., depending on the stability of the used solvent to the condensation agent, reactivity of the condensation component and reactivity of the condensation agent; it should preferably be approximately 10° to 80° C.

Synthesis Example 6

2.28 grams of diethyl benzylphosphonate and 1.50 grams of triphenylamine-4,4-dicarboaldehyde were added to 20 ml of 1,2-dimethoxy ethane, then 50% of sodium hydride was further added to it. It was agitated at the room temperature for three hours making them react with each other. Then it was heated for thirty minutes and refluxed. After it was cooled down to the room temperature, the reaction mixture was put into 200 ml of water, and the generated deposit was filtered and taken out; it was then washed by water and dried to obtain 1.46 grams (yield 65%) of powder, which was further recrystalized from the ethyl acetate and methanol, obtaining the light yellow compound (II-16) as illustrated.

The melting point of the styryl compound is 134° to 137° C.

The organic thin film electroluminescence element of the present invention is composed in various manners. Basically it is composed of the organic luminescent layer and a pair of counter electrodes with said layer located in between, the hole injection layer and/or electron injection layer being provided as required. To illustrate, the compositions are exemplified by; (a) substrate/anode/luminescent layer/cathode, (b) substrate/anode/hole injection layer/luminescent layer/- cathode, (c) substrate/anode/luminescent layer/electron injection layer/cathode, and (d) substrate/anode/hole injection layer/luminescent layer/electron injection layer/cathode.

In each of said examples, one or more luminescent layers, the hole injection and electron injection layer may be provided, or in each of them, the hole injection layer/luminescent layer, luminescent layer/electron injection layer, and hole injection layer/luminescent layer/electron injection layer may be laid in repetition; or a mixed layer of the electron injection layer and luminescent layer may be laid out between the luminescent layer and electron injection layer, or a mixed layer of the hole injection layer and luminescent layer is laid out between the hole injection layer and luminescent layer; furthermore, in each of them other layers may be provided.

The compound I of the invention is applied to the luminescent layer or the electron injection layer.

The compound II of the invention is applied to the hole injection layer.

The substrate is made of such glass plates as soda-limed glass, non-fluorescent glass, phosphoric acid based glass and boric acid based glass, plastic plates and plastic films such as quartz, acryl resin, styrone resin, polycarbonate resin, epoxy resin, polyethylene, polyester and silicone resin, and metallic plates such as alumina and metallic foil.

The anode preferably has the work function of greater than 4eV. It is made of the carbon, aluminum, vanadium, iron, cobalt, nickel, chromium, copper, zinc, tungsten, silver, tin, platinum, gold and similar metals and alloys of these metals, and zinc oxide, indium oxide, ITO, NESA and similar tin oxide or tin oxide indium based complex compounds, such compounds as copper iodide, such mixtures between oxides and metals as ZnO:Al, SnO$_2$:Sb and such conductive polymers as poly(3-methylthiophene), polypyrrole and polyaniline. The film thickness is preferably 10 to 1000 nm or more preferably 10 to 200 nm.

The cathode should preferably have the work function of greater than 4eV. It is made of the magnesium, calcium, sodium, potassium, titanium, indium, yttrium, lithium, gadolinium, ytterbium, ruthenium, manganese, aluminum, silver, tin, lead and similar metals and their alloys, and aluminum/ aluminum oxide complex. The film thickness is preferably 10 to 1000 nm or more preferably 10 to 900 nm.

When light is taken out of the electrode, one of the anode and cathode are transparent or semi-transparent with the transmissivity of 10% or more; when only the anode is transparent or semi-transparent with the transmissivity of 10% or more, the substrate should also be transparent or semitransparent.

In addition to the organic compounds presented by the formula I, the luminescent substance used for the luminescent layer includes the chelate oxinoid compound (described in the Japanese Patent LOP NO. 295695-1988, the Japanese Patent LOP NO. 15595-1990 and the Japanese Patent LOP NO. 66873-1990), perylene compound (described in Soluble Perylene Fluorescent Dyes with Photostability, Vol. 115, P.2927 (1982)", JP. Journal of Applied Physics, VOL. 27, NO.2 L269 (1988), Bull. Chem. Soc. JP. VOL. 25, L411 (1952), European Patent Publication 553,353Al, the Japanese LOP NO. 36849-1980, the Japanese Patent LOP NO. 51781-1982, the Japanese Patent LOP NO. 66873-1992, the Japanese Patent LOP NO. 196885-1990, the Japanese Patent LOP NO.288188-1990 and the Japanese Patent LOP NO. 791-1991), coumarin compound (described in the Japanese Patent LOP NO. 51781-1982, the Japanese Patent LOP NO.66873-1990 and the Japanese Patent LOP NO.792-1991), azacoumarin compound (described in the Japanese Patent LOP NO. 792-1991 and others), oxazole compound (described in the U.S. Pat. No. 3,257,203, the Japanese Patent LOP NO. 193763-1991, the Japanese Patent LOP NO. 162482-1991 and the Japanese Patent LOP NO.220396-1990), oxadiazole compound (described in the U.S. Pat. No. 3,189,447, the Japanese Patent LOP NO.216791-1990, etc.), perynone compound (described in the Japanese Patent LOP NO.888689-1990, the Japanese Patent LOP NO. 289676-1990, etc.), pyrrolopyrrole compound (described in the Japanese Patent LOP NO. 296891, etc.), naphthalene compound (described in the Japanese Patent LOP NO. 51781-1982, the Japanese Patent LOP NO. 255789-1990, the Japanese Patent LOP NO. 162485-1991, etc. ), anthracene compound (described in the Japanese Patent LOP NO. 46234-1981, the Japanese Patent LOP NO. 51781-1982, the Japanese Patent LOP NO. 66873-1990, the Japanese Patent LOP NO. 162485-1991, etc.), fluorene compound (described in the Japanese Patent LOP NO. 110837-1979, the Japanese Patent LOP NO. 162485-1991, etc.), fluoranthene compound (described in the Japanese Patent LOP NO. 162485-1991, etc.), tetracene compound (described in the Japanese Patent LOP NO. 162485-1991 etc.), pyrene compound (described in the Japanese Patent LOP NO. 51718-1982, the Japanese Patent LOP NO. 162485-1991, the Japanese Patent LOP NO. 502333-1991, etc.), coronene compound (described in the Japanese Patent LOP NO. 162485-1991, etc.), quinolone compound and azaquinolone compound (described in the Japanese Patent LOP NO. 162484-1991, etc.), pyrazoline derivative and pyrazolone derivative (described in U.S. Pat. No. 3,180,729, U.S. Pat. No. 4,278,746, the Japanese Patent LOP NO. 88064-1980, the Japanese Patent LOP NO. 88065-1980, the Japanese Patent LOP NO. 105537-1974, the Japanese Patent LOP NO. 51086-1980, the Japanese Patent LOP NO. 80051-1981, the Japanese Patent LOP NO. 88141-1981, the Japanese Patent LOP NO. 45545-1982,, the Japanese Patent LOP NO. 112637-1979, the Japanese Patent LOP NO. 74546-1980, the Japanese Patent LOP NO. 220394-1990, the Japanese Patent LOP NO. 162486-1991, etc.), rhodamine compound (described in the Japanese Patent LOP NO. 66873-1990, the Japanese Patent LOP NO. 188189-1991, etc.), chrysene compound (described in the Japanese Patent LOP NO. 51781-1982, the Japanese Patent LOP NO. 502333-1991, etc.), phenanthrene compound (described in the Japanese Patent LOP NO. 51781-1982, etc.) cyclopentadiene compound (described in the Japanese Patent LOP NO. 289675-1990, etc.), stilbene compound (described in U.S. Pat. No. 4,356,429, the Japanese Patent LOP NO. 51781-1982, the Japanese Patent LOP NO. 210363-1986, the Japanese Patent LOP NO. 228451-1986, the Japanese Patent LOP NO. 14642-1986, the Japanese Patent LOP NO. 72255-1986, the Japanese Patent LOP NO. 47646-1987, the Japanese Patent LOP NO. 36674-1987, the Japanese Patent LOP NO. 10652-1987, the Japanese Patent LOP NO. 30255-1987, the Japanese Patent LOP NO. 934454-1985, the Japanese Patent LOP NO. 94462-1985, the Japanese Patent LOP NO. 174749-1985, the Japanese Patent LOP NO. 175052-1885, the Japanese Patent LOP NO. 149652-1988, the Japanese Patent LOP NO.

173034-1989, the Japanese Patent LOP NO. 200262-1989, the Japanese Patent LOP NO. 245087-1989, etc.), diphenylquinone compound (described in "Polymer Preprints, Japan, VOL 37 P 681 (1988)" the Japanese Patent LOP NO. 152184-1991, etc.), styryl compound (described in the Japanese Patent LOP NO. 245087-1989, 209988-1990, 222484-1990, 247278-1990, etc.), butadiene compound (described in U.S. Pat. No. 4,356,429, the Japanese Patent LOP NO. 51781-1982, etc.), dicyano methylene pyran compound (described in the Japanese Patent LOP NO. 66873-1990, the Japanese Patent LOP NO.162481-1991, etc.), dicyano methylene thiopyran compound (described in the Japanese Patent LOP NO. 66873-1990, the Japanese Patent LOP NO. 162181-1991, etc.), fluorescein compound (described in the Japanese Patent LOP NO. 66873-1990, etc.), pyrylium compound (described in the Japanese Patent LOP NO. 66873-1990, etc.), thiapyrylium compound (described in the Japanese Patent LOP NO. 66873-1990, etc.), selenapyrylium compound (described in the Japanese Patent LOP NO. 66873-1990, etc.), telluropyrylium compound (described in the Japanese Patent LOP NO. 66873-1990, etc.), aromatic compound (described in the Japanese Patent LOP NO. 220393-1990, etc.), oligophenylene compound (described in the Japanese Patent LOP NO. 162484-1991, etc.), thioxanthene compound (described in the Japanese Patent LOP NO. 177486-1991, etc.), anthracene compound (described in the Japanese Patent LOP NO. 178942-1991, etc.), cyanine compound (described in the Japanese Patent LOP NO. 66873-1990, etc.), acridine compound (described in the Japanese Patent LOP NO. 51781-1982, etc.), 8-hydroxyquinoline compound metal chelate (described in the Japanese Patent LOP NO. 8287-1990, the Japanese Patent LOP NO. 8290-1990, etc.), 2,2'-bipyridine compound metal chelate (described in the Japanese Patent LOP NO. 8288-1990, the Japanese Patent LOP NO. 8289-1990, etc.), metal chelate between Schiff base and III group metal compound (described in the Japanese Patent LOP NO. 297490-1989, etc.), oxine metallic chelate compound (described in the Japanese Patent LOP NO. 176993-1991, etc.), rare earth chelate compound (described in the Japanese Patent LOP NO. 256584-1989, the Japanese Patent LOP NO. 282291, etc.) and similar fluorescent substances.

The following describes the preferable examples of these compounds:

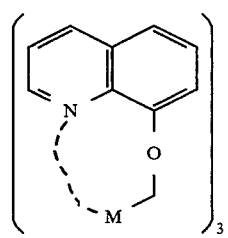

(L-1)

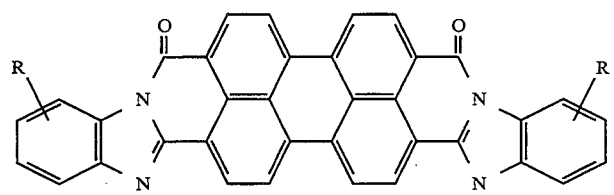

(L-2)

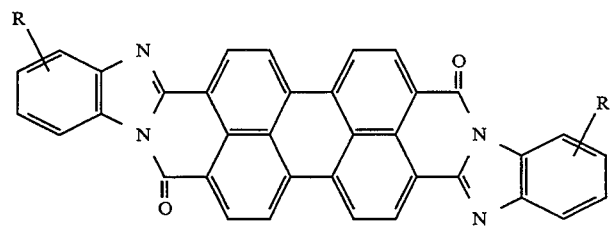

(L-3)

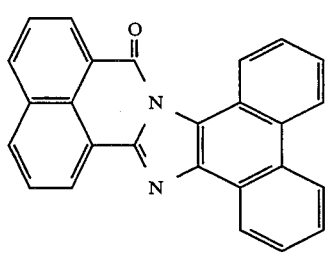

(L-4)

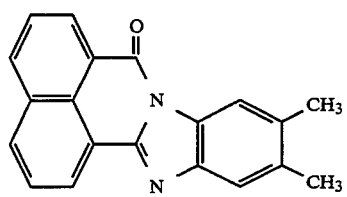 (L-5)
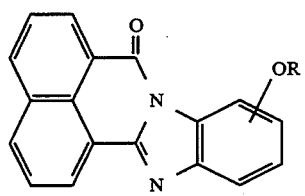 (L-6)
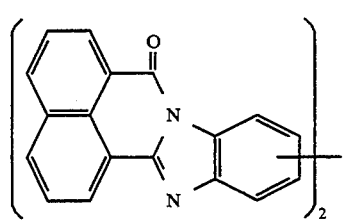 (L-7)
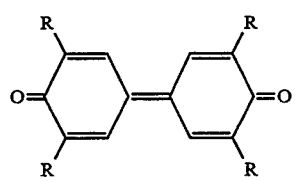 (L-8)
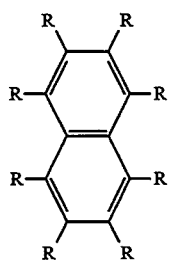 (L-9)
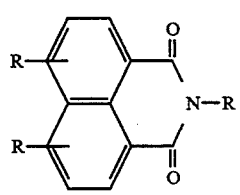 (L-10)
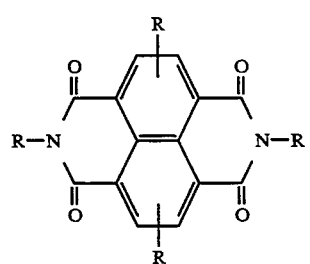 (L-11)

-continued
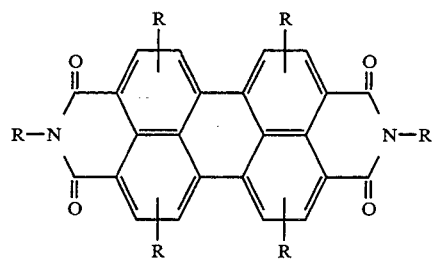 (L-12)
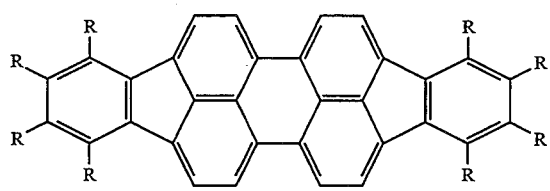 (L-13)
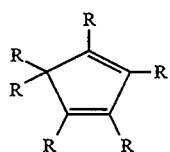 (L-14)
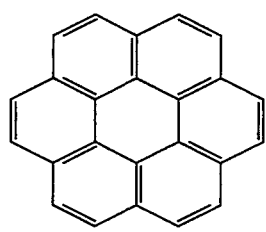 (L-15)
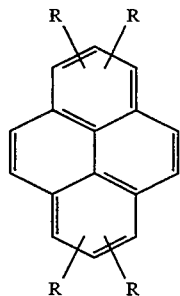 (L-16)
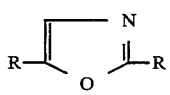 (L-17)
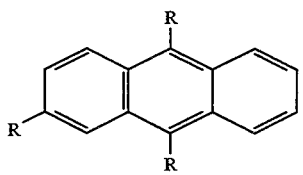 (L-18)
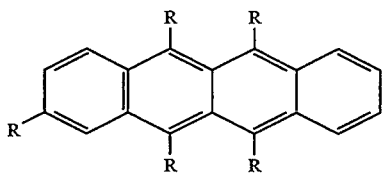 (L-19)

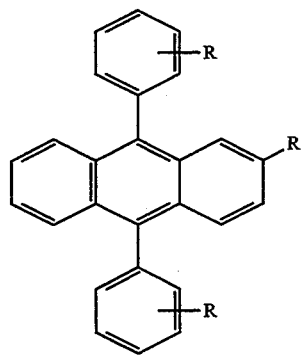
(L-20)
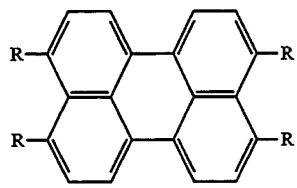
(L-21)
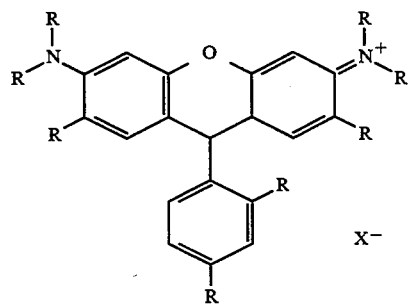
(L-22)
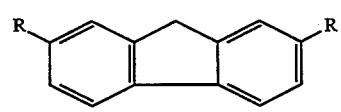
(L-23)
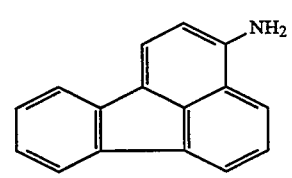
(L-24)
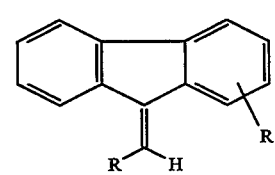
(L-25)
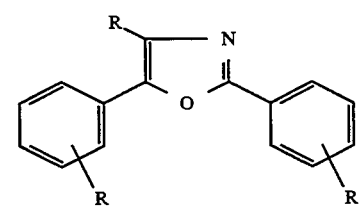
(L-26)

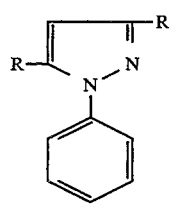
(L-27)
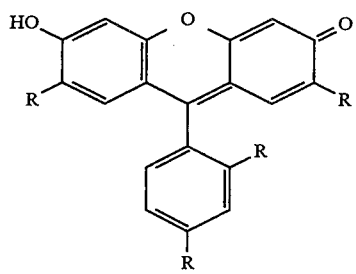
(L-28)
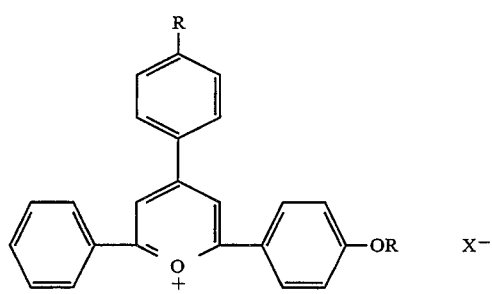
(L-29)
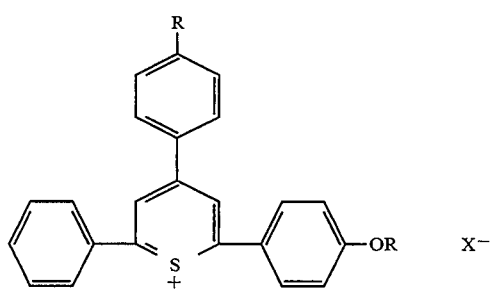
(L-30)
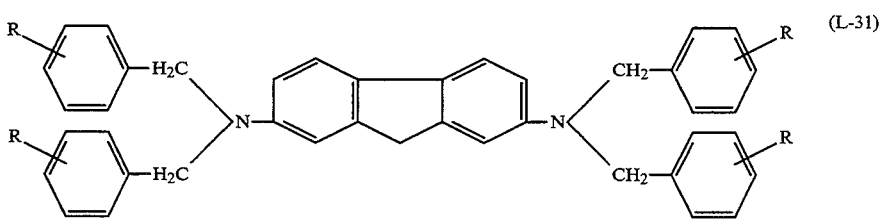
(L-31)
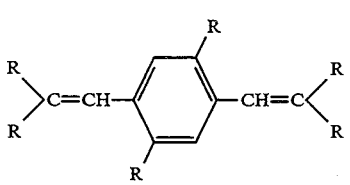
(L-32)
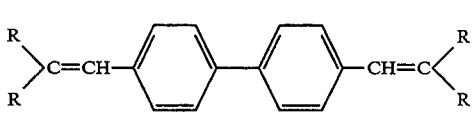
(L-33)

-continued
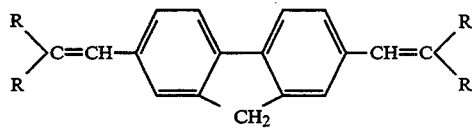
(L-34)
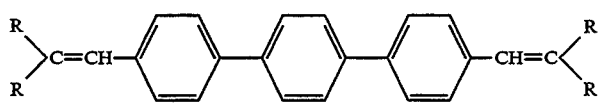
(L-35)
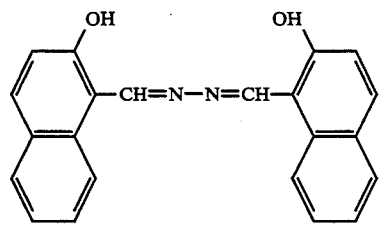
(L-36)
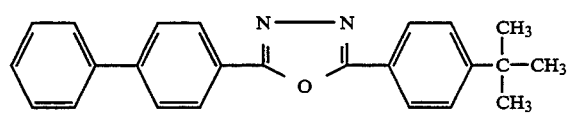
(L-37)
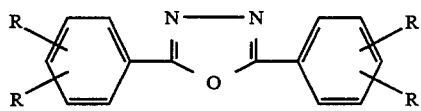
(L-38)
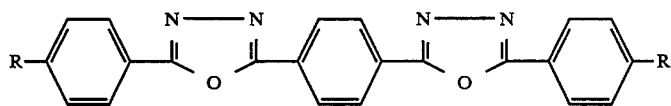
(L-39)
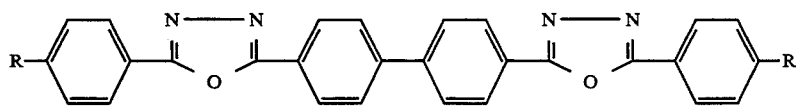
(L-40)
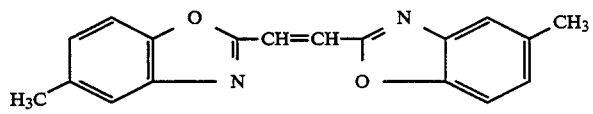
(L-41)
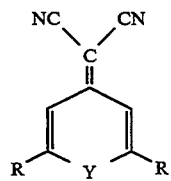
(L-42)
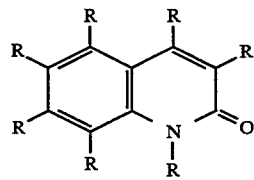
(L-43)
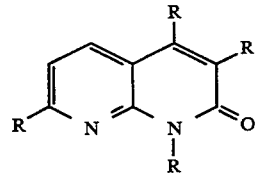
(L-44)

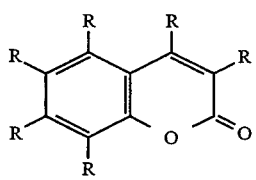 (L-45)
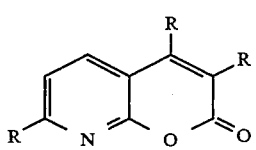 (L-46)
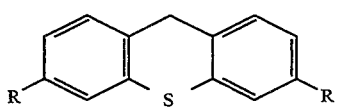 (L-47)
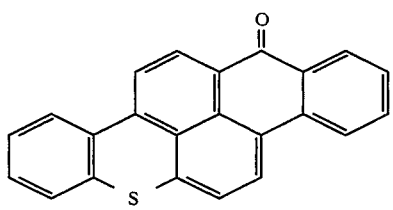 (L-48)
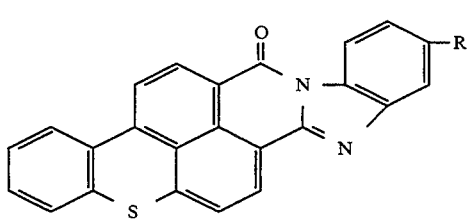 (L-49)
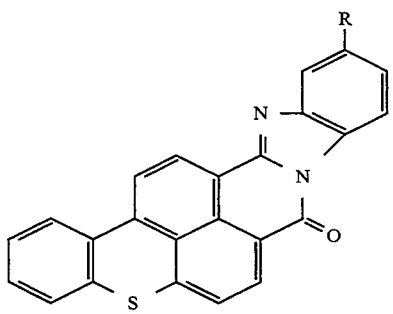 (L-50)
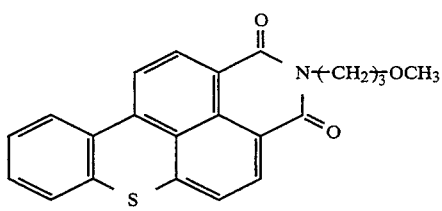 (L-51)
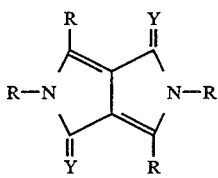 (L-52)

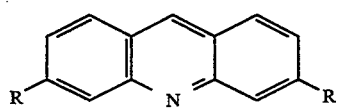
(L-53)
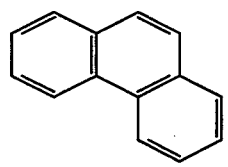
(L-54)
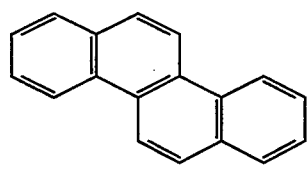
(L-55)
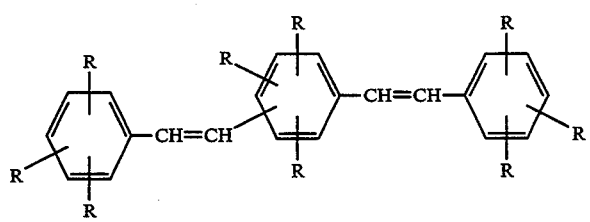
(L-56)
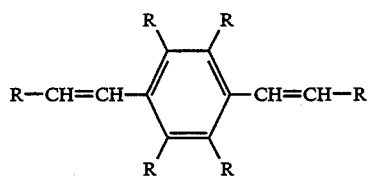
(L-57)
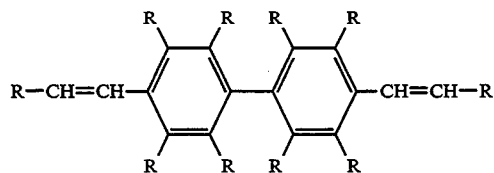
(L-58)
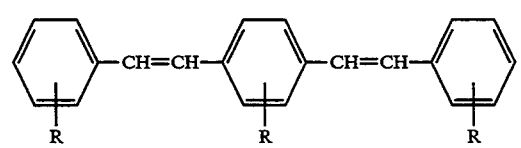
(L-59)
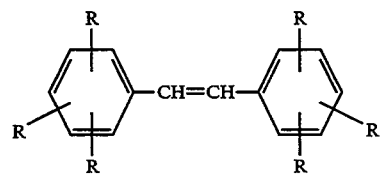
(L-60)
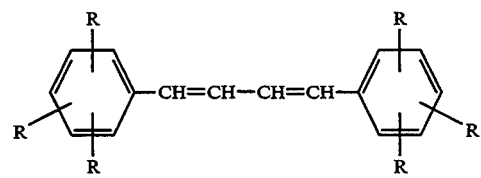
(L-61)

-continued

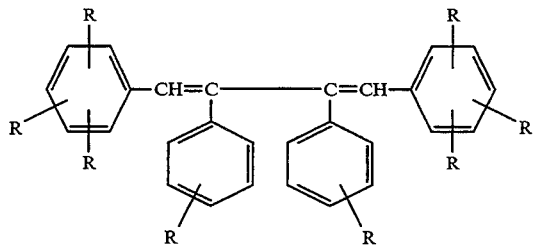
(L-62)

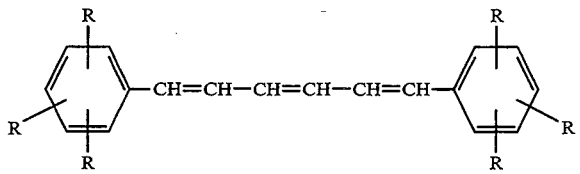
(L-63)

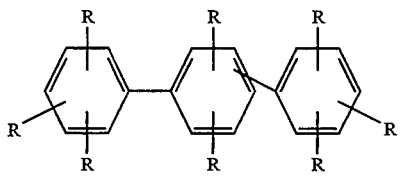
(L-64)

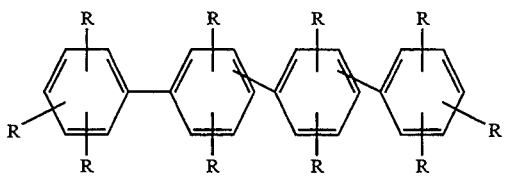
(L-65)

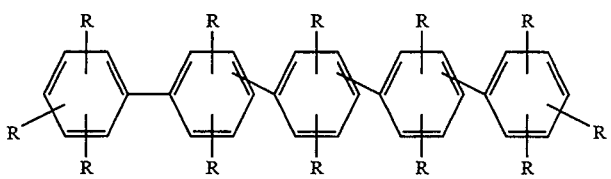
(L-66)

In the above examples, R's independently represent the hydrogen atom, halogen atom, alkyl group with or without substituent, heterocyclic compound with or without substituent, aryl group with or without substituent, univalent group derived by the unsaturated chain hydrocarbon with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group, and sulfonium group. $X^-$ represents the anion, while Y denotes chalcogen.

In addition to the organic compounds represented by the formula II, examples of the hole injection compound having the hole transfer energy used for the hole injection layer include the triazole derivative (described in U.S. Pat. No. 3,112,197, etc.), oxadiazole derivative (described in U.S. Pat. No. 3,189,447, etc.), imidazole derivative (described in the Japanese Patent LOP NO. 16096-1962, etc.), polyaryl alkane derivative (described in U.S. Pat. No. 3,615,402, U.S. Pat. No. 3,820,989, U.S. Pat. No. 3,542,544, the Japanese Patent LOP NO. 555-1970, the Japanese Patent LOP NO. 10983-1976, the Japanese Patent LOP NO. 93224-1976, the Japanese Patent LOP NO. 17105-1980, the Japanese Patent LOP NO. 4148-1981, the Japanese Patent LOP NO. 108667-1980, the Japanese Patent LOP NO. 36656-1981, the Japanese Patent LOP NO. 156953-1980, etc.), pyrazoline derivative and pyrazolone derivative (described in U.S. Pat. No. 3,180,729, U.S. Pat. No. 4,278,746, the Japanese Patent LOP NO. 88064-1980, the Japanese Patent LOP NO. 88065-1980, the Japanese Patent LOP NO. 105537-1974, the Japanese Patent LOP NO. 51086-1980, the Japanese Patent LOP NO. 80051-1981, the Japanese Patent LOP NO. 88141-1981, the Japanese Patent LOP NO. 45545-1982, the Japanese Patent LOP NO. 112637-1989 the Japanese Patent LOP NO. 74546-1980, etc.), phenylene diamine derivative (described in U.S. Pat. No. 3,615,404, the Japanese Patent LOP NO. 10105-1976, the Japanese Patent LOP NO. 3714-1971, the Japanese Patent LOP NO. 253365-1972, the Japanese Patent LOP NO. 53435-1979, the Japanese Patent LOP NO. 110536-1979, the Japanese Patent LOP NO. 119925-1979, etc.), arylanime derivative (described in U.S. Pat. No. 3,567,450, U.S. Pat. No. 3,180,703, U.S. Pat. No. 3,240,597, U.S. Pat. No. 3,658,520, U.S. Pat. No. 4,232,103, U.S. Pat. No. 4,175,961, U.S. Pat. No. 4,012,376, the Japanese Patent LOP NO. 35702-1974, the Japanese Patent LOP NO. 27577-1964, the Japanese Patent LOP NO. 144250-1980, the Japanese Patent LOP NO. 22437-1981, West Germany Patent NO. 1,110,518, etc. ), amino substituted chalcone (described in U.S. Pat. No. 3,526,501, etc.), oxazole derivative (described in U.S. Pat. No. 3,257,203, etc. ), styryl anthracene derivative (described in the Japanese Patent LOP NO. 46234-1981, etc.), fluorenone derivative (described in the Japanese Patent LOP NO. 110837-1979, etc.), hydrazone derivative (described in U.S. Pat. No. 3,717,462, the Japanese Patent LOP NO. 59143-1979, the Japanese Patent LOP NO. 52063-1980, the Japanese Patent LOP NO. 52064-1980, the Japanese Patent LOP NO. 46760-1980, the Japanese Patent LOP NO. 85495-1980, the Japanese Patent LOP NO. 148749-1982, the Japanese Patent LOP NO. 136059-1991, the Japanese Patent LOP NO. 138654-1991, etc.), stilbene derivative (described in the Japanese Patent LOP NO. 210363-1986, the Japanese Patent LOP NO. 228451-1986, the Japanese Patent LOP NO. 14942-1986, the Japanese Patent LOP NO. 72255-1986, the Japanese Patent LOP NO. 47646-1987, the Japanese Patent LOP NO. 36674-1987, the Japanese Patent LOP NO. 10652-1987, the Japanese Patent LOP NO. 30255-1987, the Japanese Patent LOP NO. 934454-1985, the Japanese Patent LOP NO. 94462-1985, the Japanese Patent LOP NO. 174749-1985, the Japanese Patent LOP NO. 175052-1985, the Japanese Patent LOP NO. 149652-1988, the Japanese Patent LOP NO. 173034-1989, the Japanese Patent LOP NO. 200262-1989, etc.), polyphyline compound (described in U.S. Pat. No. 3,935,0031, U.S. Pat. No. 4,356,429, the Japanese Patent LOP NO. 295695-1988, the Japanese Patent LOP NO. 12795-1990, etc.), aromatic III group amine compound and styryl amine compound (described in U.S. Pat. No. 4,127,412, the Japanese Patent LOP NO. 27033-1978, the Japanese Patent LOP NO. 58445-1979, the Japanese Patent LOP NO. 149634-1979, the Japanese Patent LOP NO. 64299-1979, the Japanese Patent LOP NO. 79450-1980, the Japanese Patent LOP NO. 144250-1980, the Japanese Patent LOP NO. 119132-1981, the Japanese Patent LOP NO. 295558-1986, the Japanese Patent LOP NO. 98353-1986, the Japanese Patent LOP NO. 295695-1988, the Japanese Patent LOP NO. 243393-1989, the Japanese Patent LOP NO. 111485-1991, etc.), butadiene compound (described in the Japanese Patent LOP NO. 111484-1991, etc.), polystyrene compound (described in the Japanese Patent LOP NO. 95291-1991, etc.), hydrazone compound (described in the Japanese Patent LOP NO. 137187-1991, etc.), triphenyl methane derivative, tetraphenyl benzidine derivative (described in the Japanese Patent LOP NO. 54289-1991, etc.). These substances can be used, but preferred substances to be used are polyphyline compound, aromatic tertiary amine compound and styryl amine compound.

The following describes their typical examples:

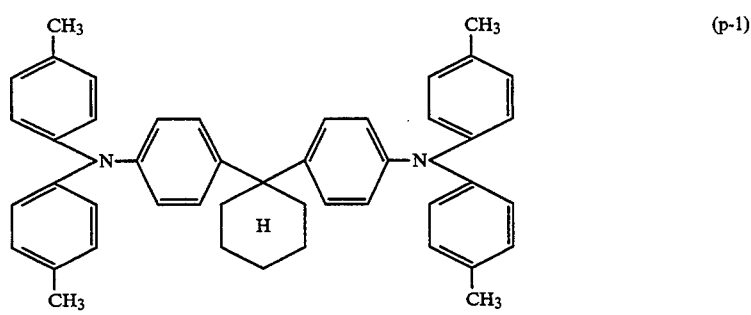

(p-1)

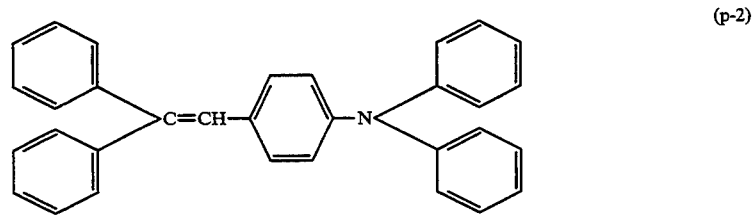

(p-2)

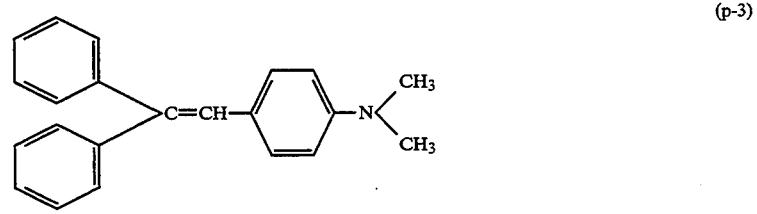

(p-3)

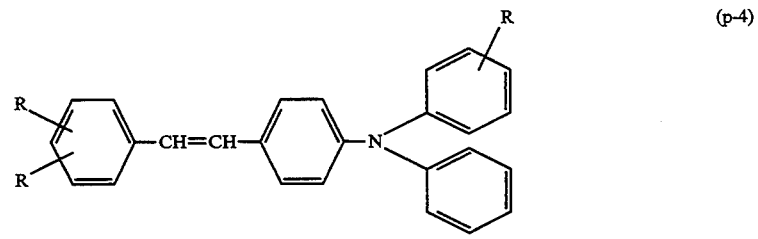

(p-4)

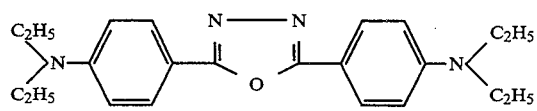
(p-5)
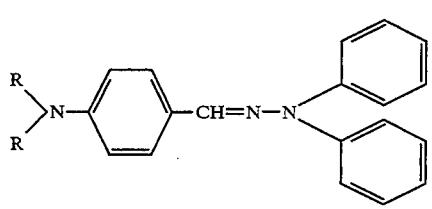
(p-6)
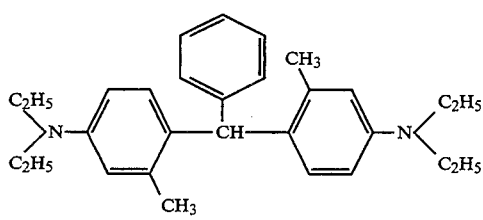
(p-7)
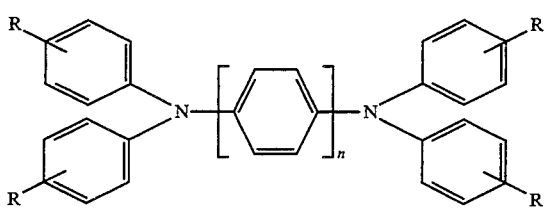
(p-8)
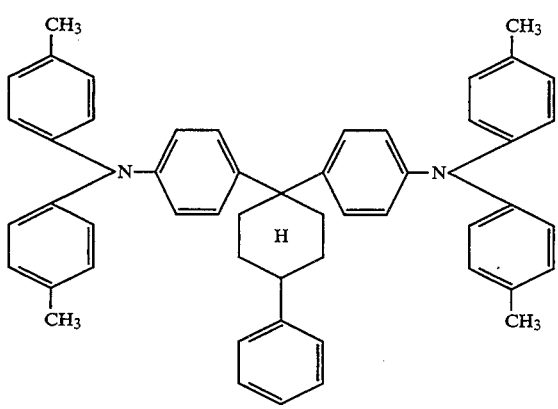
(p-9)
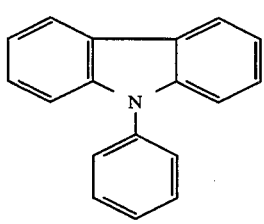
(p-10)
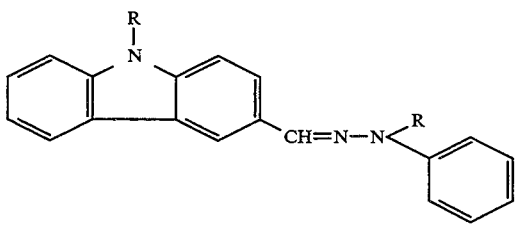
(p-11)

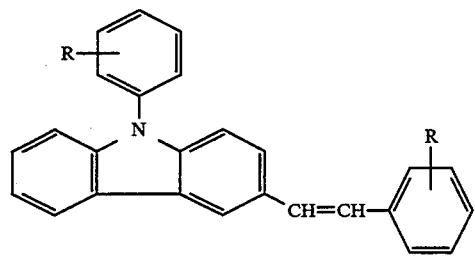
(p-12)
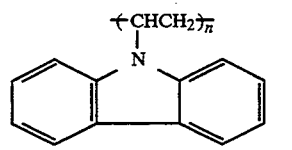
(p-13)
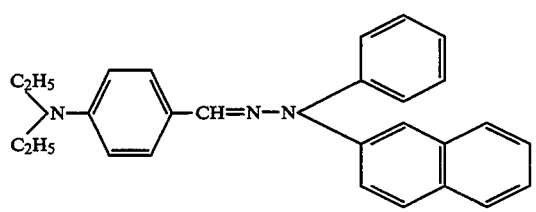
(p-14)
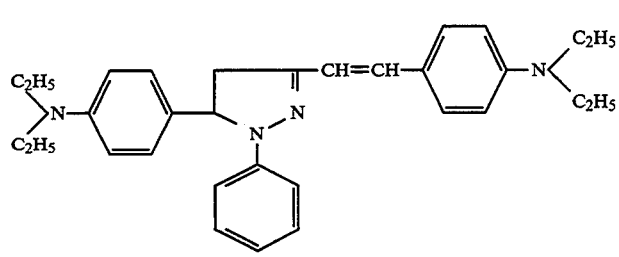
(p-15)
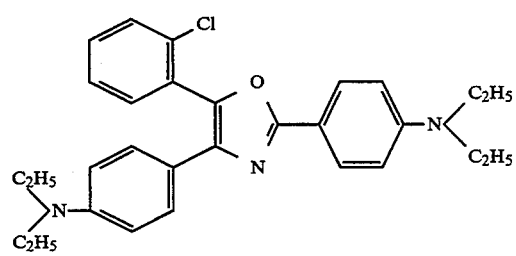
(p-16)
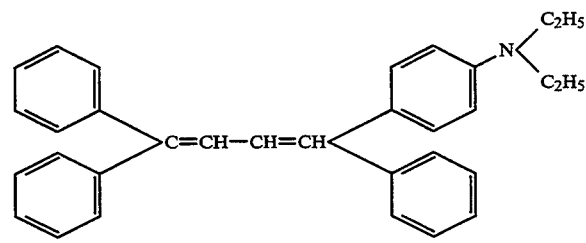
(p-16)
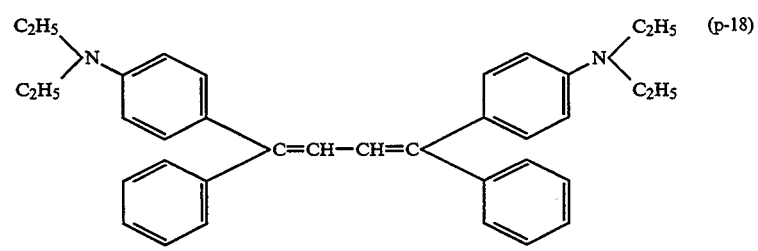
(p-18)

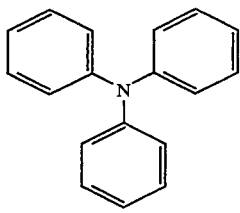
(p-19)
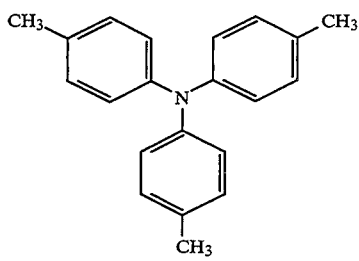
(p-20)
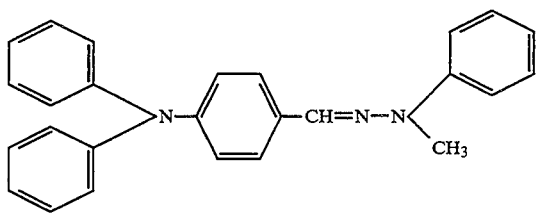
(p-21)
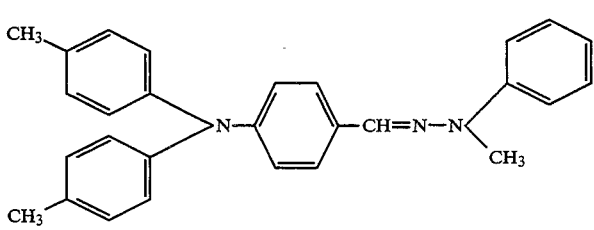
(p-22)
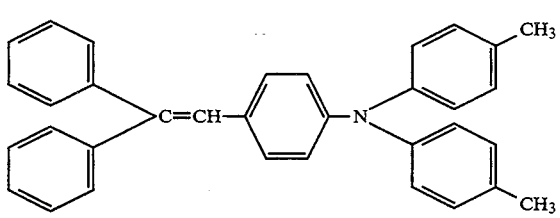
(p-23)
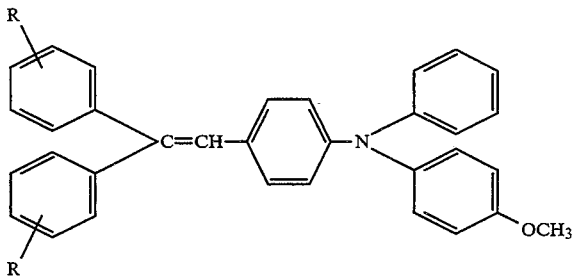
(p-24)

-continued
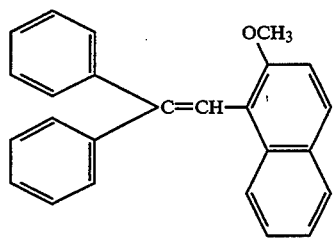
(p-25)
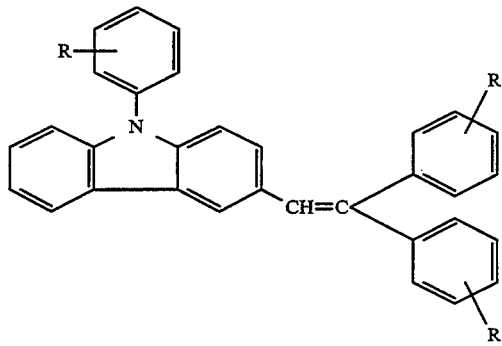
(p-26)
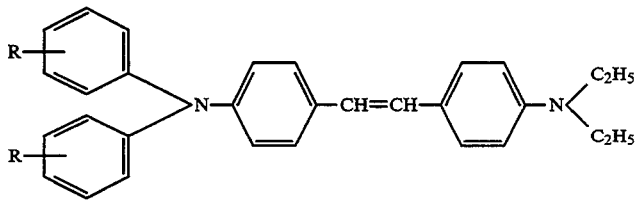
(p-27)
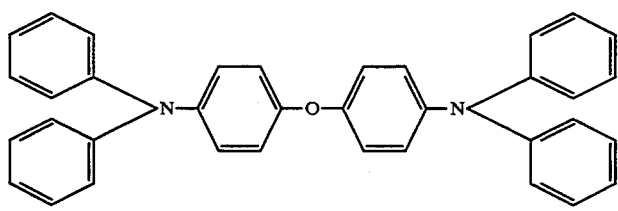
(p-28)
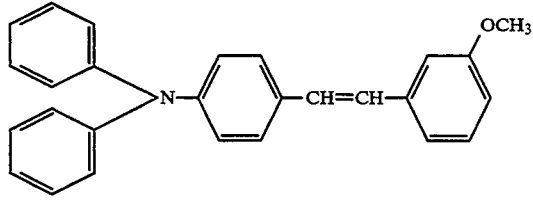
(p-29)
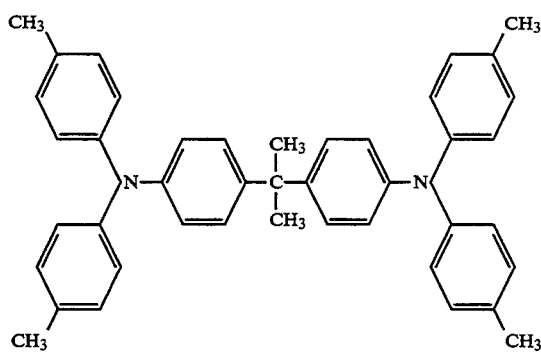
(p-30)

-continued
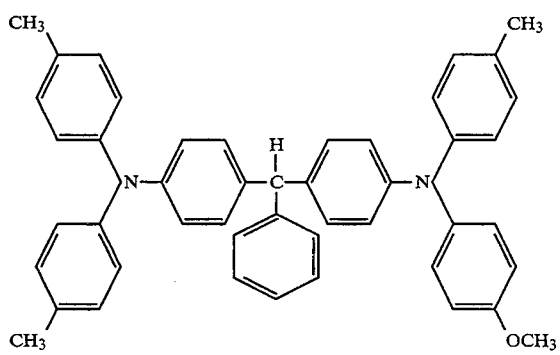 (p-31)
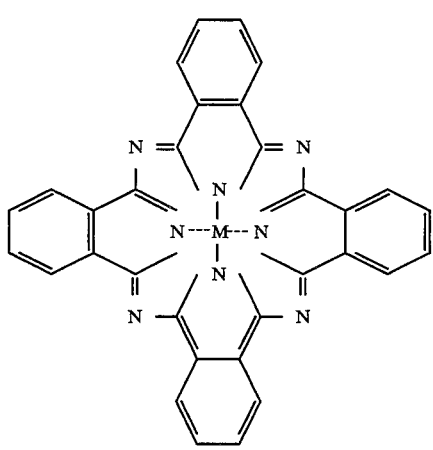 (p-32)
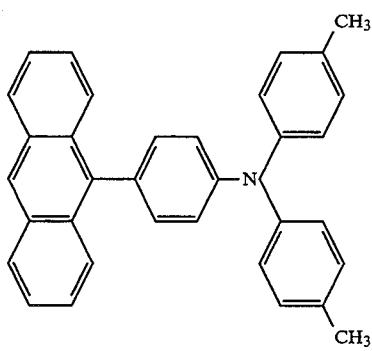 (p-33)
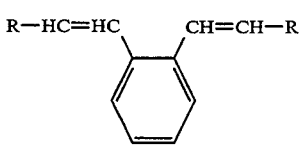 (p-34)
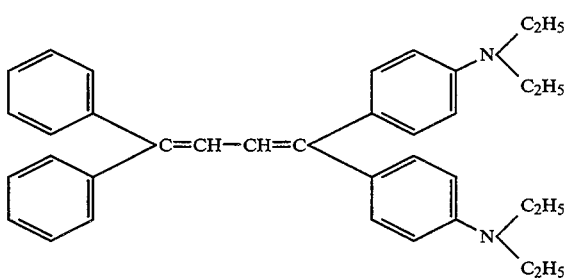 (p-35)

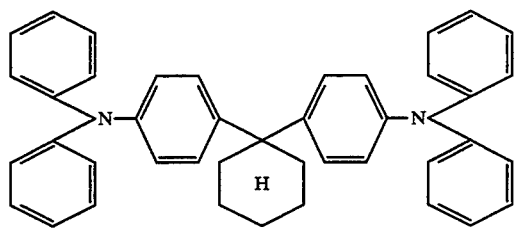

(p-36)

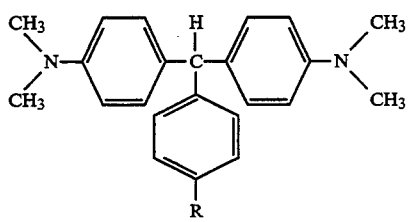

(p-37)

In the above examples, each R independently represents a hydrogen atom, halogen atom, alkyl group with or without substituent, heterocyclic compound with or without substituent, aryl group with or without substituent, univalent group derived by the unsaturated chain hydrocarbon with or without substituent, group including more than two nitrogen atoms; styryl group with or without substituent, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group and sulfonium group. "n" represents an integer of 1 or more, and "M" denotes the metal atom.

In addition to the organic compounds represented by said general formula, examples of the hole injection compound having the hole transfer energy used for the hole injection layer include nitro non-substituted fluorenone derivative, thiopyran dioxide derivative, diphenylquinone (described in "Polymer Preprints, Japan, VOL 37, NO 3, P 681, (1988)" the Japanese Patent LOP NO. 152184-1991, etc.), perylene tetracarboxyl derivative (described in "JP. Journal of Applied Physics, VOL 27, NO 2 L269 (1988)" "Bull Chem Soc JP VOL. 25, L411 (1952)", etc.) anthraquinodimethane derivative (described in the Japanese Patent LOP NO. 149259-1982, the Japanese Patent LOP NO. 55450-1983, the Japanese Patent LOP NO. 2251-1986, the Japanese Patent LOP NO. 133750-1986, the Japanese Patent LOP NO. 104061-1988,. etc.), fluoronylidene methane derivative (described in the Japanese Patent LOP NO. 69657-1985, the Japanese Patent LOP NO. 143764-1986, the Japanese Patent LOP NO. 148159-1986, etc.), anthrone derivative (described in the Japanese Patent LOP NO. 225151-1986, the Japanese Patent LOP NO. 233750-1986, etc.), oxadiazole (described in the Japanese Patent LOP NO. 79692-1991, etc.), perynone derivative (described in the Japanese Patent LOP NO. 289676-1990, etc.), and quinoline complex derivative. The following describes their typical examples:

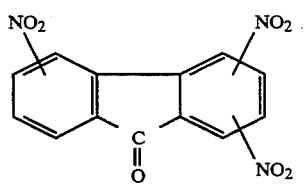

(n-1)

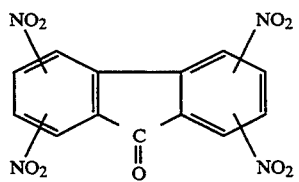

(n-2)

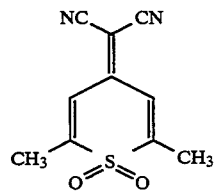

(n-3)

-continued
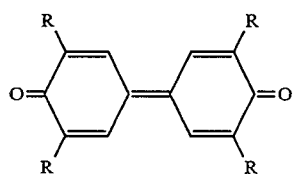
(n-4)
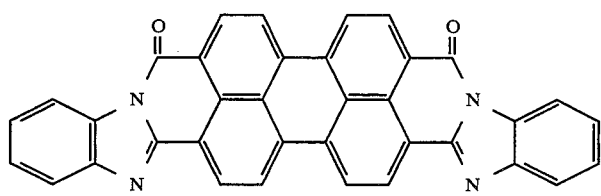
(n-5)
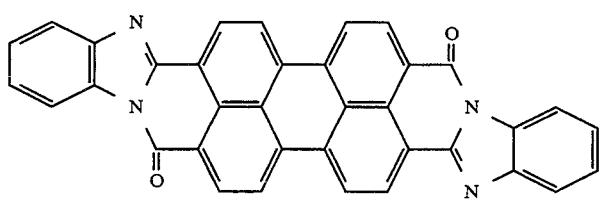
(n-6)
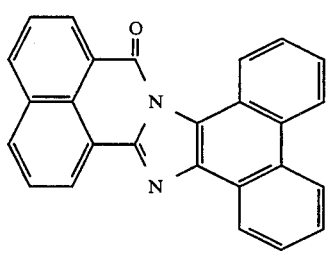
(n-7)
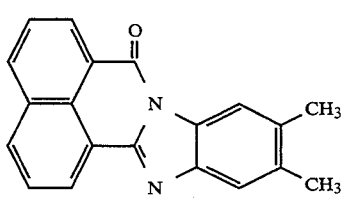
(n-8)
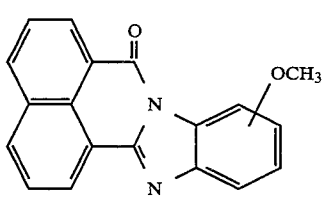
(n-9)
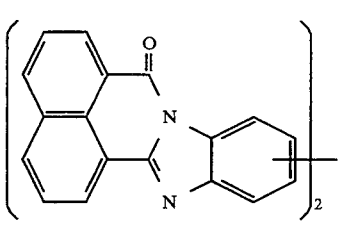
(n-10)

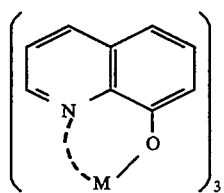
(n-11)

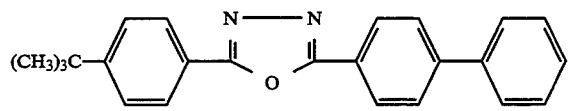
(n-12)

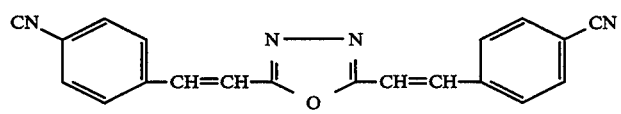
(n-13)

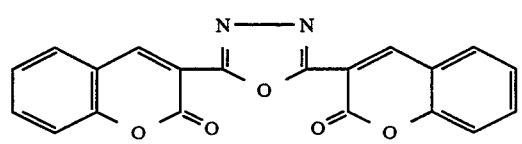
(n-14)

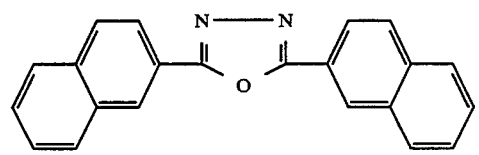
(n-15)

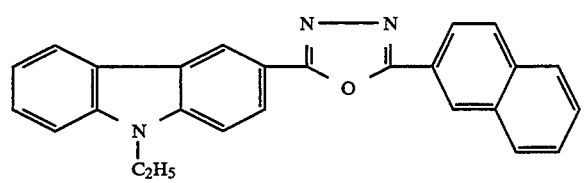
(n-16)

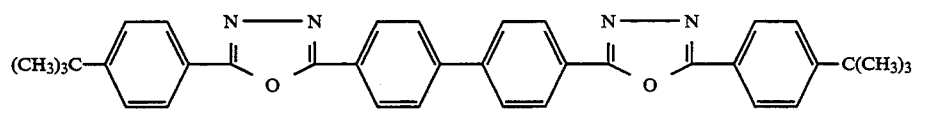
(n-17)

In the above examples, each R independently represent a hydrogen atom, halogen atom, and alkyl group with or without substituent, heterocyclic compound with or without substituent, aryl group with or without substituent, univalent group derived by the unsaturated chain hydrocarbon with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group and sulfonium group. "M" represents the metal atom.

The luminescent layer is formed by the deposition method, spin coating method or casting method, and the film thickness should preferably be 10 to 1000 nm, and more preferably be 20 to 150 nm. The hole injection layer is formed by the deposition method, spin coating method or casting method, and the film thickness should preferably be 40 to 200 nm. The electron injection layer is formed by the deposition method, spin coating method or casting method, and the film thickness should preferably be 10 to 1000 nm, and more preferably be 30 to 200 nm.

EXAMPLE

The substrate in which 150 nm-thick indium-tin oxide (ITO) film is formed on the glass (P110E-H-PS by Japan Plate Glass Co., Ltd.) was patterned into the desired form, and was polished in water using the alumina abrasive. After washing in water, it was subjected to ultrasonic water cleaning for ten minutes twice, acetone ultrasonic cleaning for ten minutes twice, and isopropyl alcohol ultrasonic cleaning for ten minutes twice; then it was dried by hot air at the temperature of 90° C., thereby obtaining the substrate having the ITO film as the anode. In all examples the substrate is used as an anode.

Example 1

In the tungsten board (SF208 by Japan Pax Metal Co., Ltd.), the compound (p-1) was vacuum deposited at the film forming speed of 0.2 nm/sec. under the vacuum condition of $8.0 \times 10^{-7}$ Torr, to obtain the 80 nm-thick hole injection layer.

The compound (1-1) was then put into the molybdenum board (SS-1-9 by Japan Pax Metal Co., Ltd.) without breaking the vacuum condition, the 63 nm-thick luminescent layer was vapor-deposited at the film forming speed of 0.2 nm/sec. under the vacuum condition of $8.0 \times 10^{-7}$ Torr, obtaining the 63 nm-thick luminescent layer.

Further to this, the 500 nm-thick Mg/Ag alloy (at 10:1 atom ratio) was vapor-deposited without breaking the vacuum condition, thereby obtaining the cathode.

The external power supply was connected to the organic thin film electroluminescence element obtained in this manner, and 18-volt direct current voltage was applied; thus, light having the maximum wave length of 620 nm and the maximum luminance of 61.4 cd/m² was emitted. Continuous lighting was tried by applying the 18-volt direct current voltage under the nitrogen gas atmosphere at the temperature of 23° C., and the luminance was reduced to a half in 1,510 hours.

Example 1 was repeated with modification where the compound and thickness of both hole injection layer and luminescent layer and applied voltage were changed to obtain the other Examples. Experimental conditions and the results are summarized in Tables.

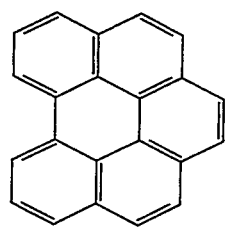

I

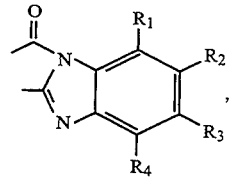

wherein Z is $Z_1$

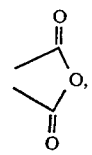

$Z_2$

Table

| Example No. | Hole injection layer Compound | Thickness (nm) | Luminescent layer Compound | Thickness (nm) | Voltage applied (Volts) | Maximum luminance (cd/m²) | Time reduced to half luminance (hrs) |
|---|---|---|---|---|---|---|---|
| 1 | p-1 | 80 | 1-1 | 63 | 18 | 61.4 | 1510 |
| 2 | p-8-1 | 81 | 1-1 | 63 | 19 | 46.3 | 1460 |
| 3 | p-2 | 79 | 1-1 | 62 | 20 | 44.1 | 1240 |
| 4 | p-4-1 | 81 | 1-1 | 63 | 19 | 45.4 | 1320 |
| 5 | p-4-2 | 80 | 1-1 | 63 | 19 | 48.4 | 1375 |
| 6 | p-4-3 | 79 | 1-1 | 63 | 18 | 47.2 | 1401 |
| 7 | p-5 | 80 | 1-1 | 62 | 21 | 43.1 | 1300 |
| 8 | p-24-1 | 81 | 1-1 | 63 | 19 | 50.4 | 1390 |
| 9 | p-27-1 | 81 | 1-1 | 63 | 19 | 45.2 | 1398 |
| 10 | p-35 | 81 | 2-1 | 62 | 18 | 57.3 | 1490 |
| 11 | p-1 | 80 | 1-2 | 64 | 19 | 53.8 | 1480 |
| 12 | p-1 | 80 | 2-1 | 63 | 24 | 40.1 | 1550 |
| 13 | p-1 | 80 | 4-1 | 64 | 15 | 48.6 | 1490 |
| 14 | p-1 | 81 | 3-14 | 63 | 21 | 46.8 | 1487 |
| 15 | p-1 | 81 | 5-1 | 64 | 20 | 47.9 | 1401 |
| Comp. 1 | p-1 | 80 | A* | 64 | 24 | 28.3 | 630 |
| 16 | II-72 | 81 | 1-1 | 63 | 17 | 63.9 | 1589 |
| 17 | II-9 | 79 | 1-1 | 64 | 18 | 58.0 | 1432 |
| 18 | II-48 | 80 | 1-1 | 62 | 19 | 57.7 | 1413 |
| 19 | II-91 | 80 | 1-1 | 62 | 19 | 57.6 | 1487 |
| 20 | II-14 | 80 | 1-1 | 63 | 19 | 54.7 | 1404 |
| 21 | II-84 | 81 | 1-1 | 63 | 17 | 60.7 | 1532 |
| 22 | II-72 | 82 | 1-2 | 62 | 18 | 55.1 | 1529 |
| 23 | II-27 | 81 | 2-1 | 63 | 22 | 48.3 | 1652 |
| 24 | II-72 | 80 | 4-1 | 63 | 15 | 52.4 | 1552 |
| 25 | II-72 | 80 | 5-1 | 62 | 19 | 50.8 | 1529 |
| 26 | II-72 | 81 | 3-11 | 63 | 20 | 50.1 | 1501 |
| Comp. 2 | B** | 80 | A* | 64 | 24 | 28.3 | 630 |
| Comp. 3 | II-72 | 81 | A* | 64 | 23 | 43.2 | 932 |

A* Tris(8-hydroxylquinolin)aluminium
B** 1,1-Bis(4-di-p-tolylaminophenyl)cyclohexane

We claim:
1. An organic thin film electroluminescent element comprising counter electrodes and plural organic compound layers located between the electrodes, said organic compound layers comprising a luminescent layer, and a hole injection layer wherein said luminescent layer comprises a compound of formula I defined below; or said organic compound layers comprise an electron injection layer, a luminescent layer and a hole injection layer wherein said electron injection layer comprises an organic compound represented by formula I,

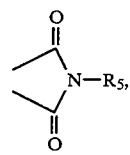

$Z_3$

-continued

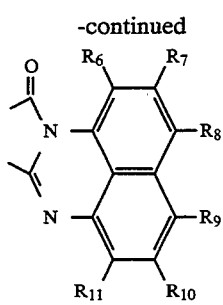

or

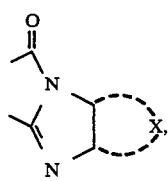

wherein $R_1$ to $R_{11}$ independently represent the hydrogen atom, halogen atom, alkyl group with or without substituent, univalent group derived from an unsaturated chain hydrocarbon with or without substituent, heterocyclic compound with or without a substituent, aryl group with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group, sulfonium group and heterocyclic group, and $R_1$ and $R_2$, $R_2$ and $R_3$, $R_3$ and $R_4$, $R_6$ and $R_7$, $R_7$ and $R_8$, $R_8$ and $R_9$, $R_9$ and $R_{10}$, and $R_{10}$ and $R_{11}$ may combine with each other to form an unsaturated ring structure with or without substituent;

X represents the heterocyclic ring with or without substituent.

2. An organic thin film electroluminescent element according to claim 1, wherein Z is $Z_1$ or $Z_4$.

3. An organic thin film electroluminescent element according to claim 1, wherein the organic compound is represented by

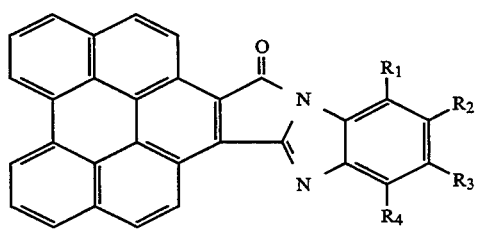

or

-continued

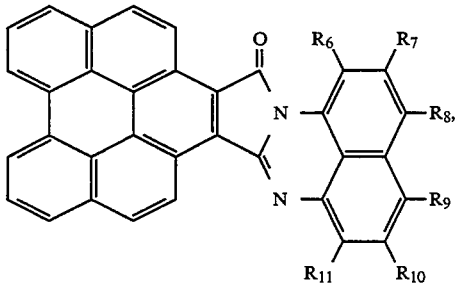

wherein $R_1$ to $R_4$, and $R_6$ to $R_{11}$ are the same as defined in claim 1.

4. An organic thin film electroluminescent element according to claim 3, wherein $R_1$ to $R_4$, and $R_6$ to $R_{11}$ are a hydrogen atom, an alkyl group and heterocyclic group.

5. An organic thin film electroluminescent element according to claim 1, wherein the hole injection layer comprises a compound represented by formula II,

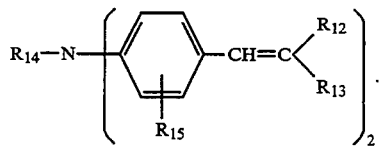

$R_{12}$ and $R_{13}$ independently represent the hydrogen atom, alkyl group with or without substituent, heterocyclic ring group with or without substituent, aryl group with or without substituent, and univalent group derived from the unsaturated chain hydrocarbon with or without substituent, or $R_{12}$ and $R_{13}$ represent a saturated or unsaturated ring in combination therewith, wherein the ring may be substituted or not substituted, $R_{14}$ represents the alkyl group with or without substituent, aryl group with or without substituent, alkoxy group with or without substituent, or a group of

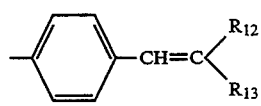

wherein $R_{12}$ and $R_{13}$ are the same as defined above, $R_{15}$ is a hydrogen atom, or alkyl group, aryl group or alkoxy group each of which may be substituted or not substituted.

6. An organic thin film electroluminescent element according to claim 5, wherein the compound represented by formula II is

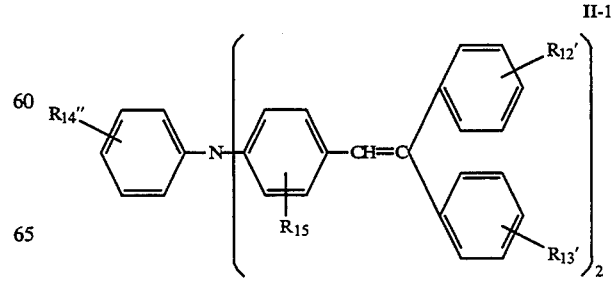

or

-continued

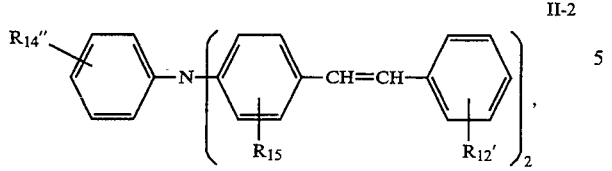

II-2 wherein $R_{12}'$ and $R_{13}'$ independently represent the hydrogen atom, alkyl group with or without substituent, heterocyclic ring group with or without substituent, aryl group with or without substituent, and univalent group derived from the unsaturated chain hydrocarbon with or without substituent, and $R_{12}'$ and $R_{13}'$ are subjected to easy combination and may form a saturated or unsaturated ring structure with or without substituent, $R_{14}''$ represents an alkyl group with or without substituent, aryl group with or without substituent, alkoxy group with or without substituent, or a group of

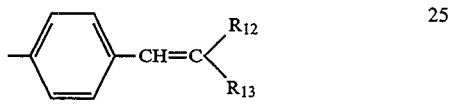

wherein $R_{12}$ and $R_{13}$ independently represent the hydrogen atom, alkyl group with or without substituent, heterocyclic ring group with or without substituent, aryl group with or without substituent, and univalent group derived from the unsaturated chain hydrocarbon with or without substituent, or $R_{12}$ and $R_{13}$ represent a saturated or unsaturated ring in combination therewith, wherein the ring may be substituted or not substituted, $R_{15}$ is a hydrogen atom, or alkyl group, aryl group or alkoxy group each of which may be substituted or not substituted.

7. An organic thin film electroluminescent element comprising a cathode, a first organic compound layer comprising a compound represented by formula I, a second organic compound layer comprising a compound represented by formula II, an anode and a substrate,

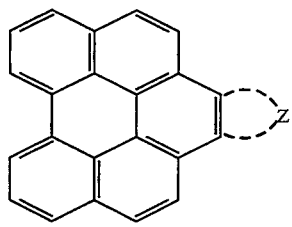 I wherein Z is

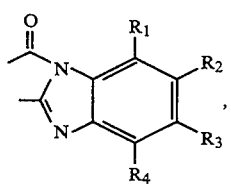 $Z_1$

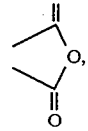 $Z_2$

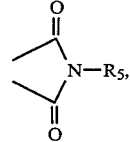 $Z_3$

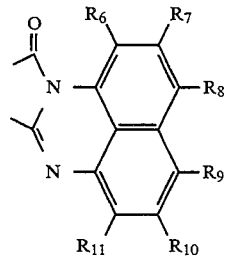 $Z_4$ or

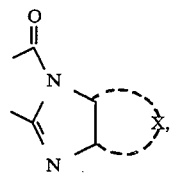 $Z_5$ wherein $R_1$ to $R_{11}$ independently represent the hydrogen atom, halogen atom, alkyl group with or without substituent, univalent group derived from an unsaturated chain hydrocarbon with or without substituent, heterocyclic compound with or without a substituent, aryl group with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group, sulfonium group and heterocyclic group, and $R_1$ and $R_2$, $R_2$ and $R_3$, $R_3$ and $R_4$, $R_6$ and $R_7$, $R_7$ and $R_8$, $R_8$ and $R_9$, $R_9$ and $R_{10}$, and $R_{10}$ and $R_{11}$ may combine with each other to form an unsaturated ring structure with or without substituent;

X represents the heterocyclic ring with or without substituent,

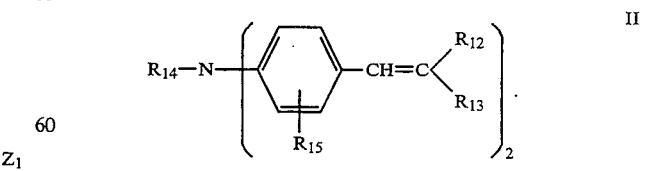 II $R_{12}$ and $R_{13}$ independently represent the hydrogen atom, alkyl group with or without substituent, heterocyclic ring group with or without substituent, aryl group with or without substituent, and univalent group derived from the unsaturated chain hydrocarbon with or without substituent, or $R_{12}$ and $R_{13}$ represent a saturated or unsaturated ring in combination therewith, wherein the ring may be substituted or not substituted, $R_{14}$ represents the alkyl group with or without substituent, aryl group with or without substituent, alkoxy group with or without substituent, or a group of

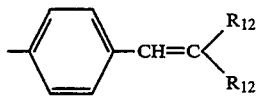

wherein $R_{12}$ and $R_{13}$ are the same as defined above, $R_{15}$ is a hydrogen atom, or alkyl group, aryl group or alkoxy group each of which may be substituted or not substituted.

8. An organic thin film electroluminescent element comprising a cathode, an organic compound layer comprising a compound represented by formula I-1 or I-4, an organic compound layer comprising a compound represented by formula II, an anode and a substrate,

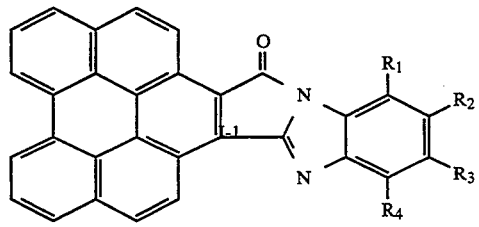

or

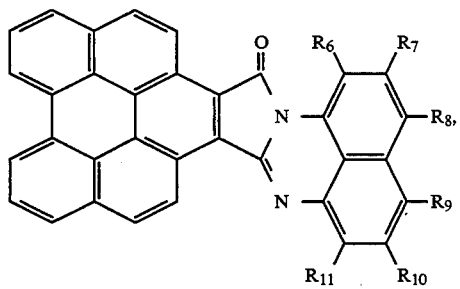

wherein $R_1$ to $R_4$, and $R_6$ to $R_{11}$,
independently represent the hydrogen atom, halogen atom, alkyl group with or without substituent, univalent group derived from an unsaturated chain hydrocarbon with or without substituent, heterocyclic compound with or without a substituent, aryl group with or without substituent, group including more than two nitrogen atoms with or without substituent, styryl group, anisyl group, amino group, alkyl amino group, dialkyl amino group, alkoxy group, alkoxy carbonyl group, amino carbonyl group, aryloxy carbonyl group, carboxyl group, acyl group, aryloxyl group, aralkyl group, acylamino group, acyloxyl group, hydroxyl group, cyano group, nitro group, sulfo group, sulfonium group and heterocyclic group, and $R_1$ and $R_2$, $R_2$ and $R_3$, $R_3$ and $R_4$, $R_6$ and $R_7$, $R_7$ and $R_8$, $R_8$ and $R_9$, $R_9$ and $R_{10}$, and $R_{10}$ and $R_{11}$ may combine with each other to form an unsaturated ring structure with or without substituent;

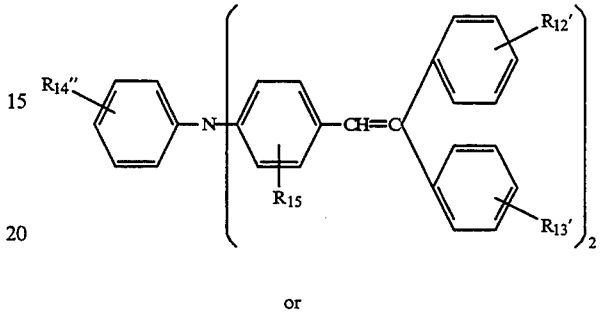

or

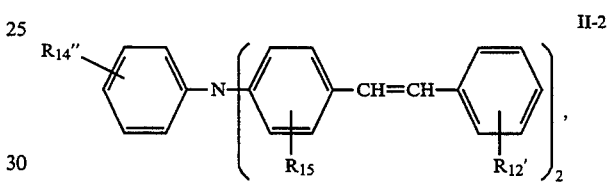

wherein $R_{12}'$ and $R_{13}'$ independently represent the hydrogen atom, alkyl group with or without substituent, heterocyclic ring group with or without substituent, aryl group with or without substituent, and univalent group derived from the unsaturated chain hydrocarbon with or without substituent, $R_{14}''$ represents an alkyl group with or without substituent, aryl group with or without substituent, alkoxy group with or without substituent, or a group of

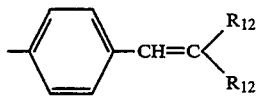

wherein $R_{12}$ and $R_{13}$ independently represent the hydrogen alkyl group with or without substituent, heterocyclic ring group with or without substituent, aryl group with or without substituent, and univalent group derived from the unsaturated chain hydrocarbon with or without substituent, or $R_{12}$ and $R_{13}$ represent a saturated or unsaturated ring in combination therewith, wherein the ring may be substituted or not substituted, $R_{15}$ is a hydrogen atom, or alkyl group, aryl group or alkoxy group each of which may be substituted or not substituted.

9. The organic thin film electroluminescent element of claim 1 wherein the organic compound is one of the following compounds ( 1-1 )–( 1-27 ):

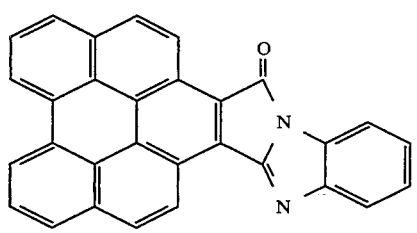 (1-1)
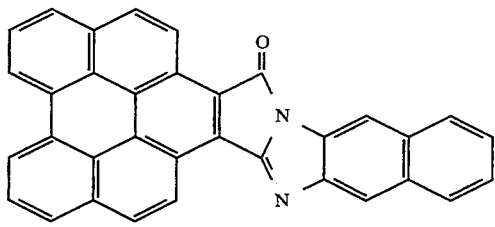 (1-2)
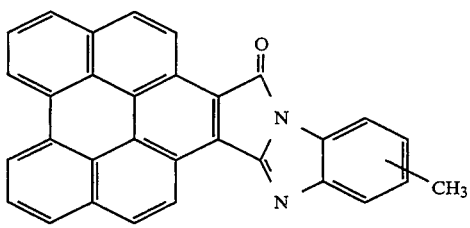 (1-3)
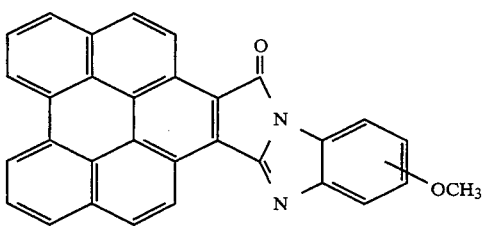 (1-4)
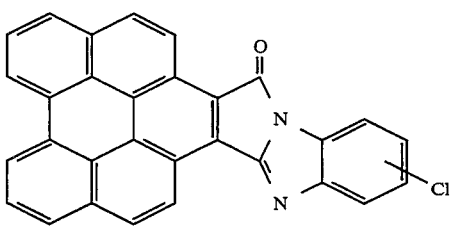 (1-5)
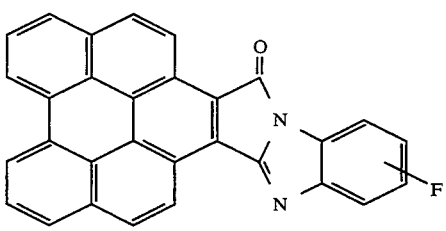 (1-6)
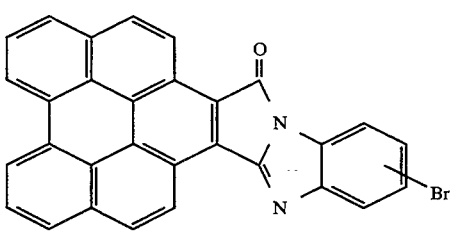 (1-7)

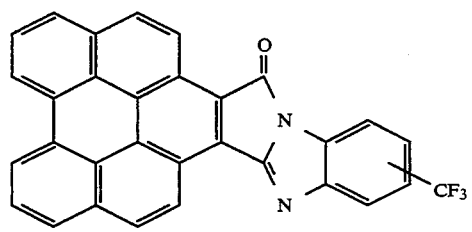 (1-8)
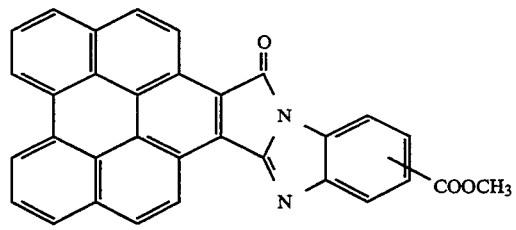 (1-9)
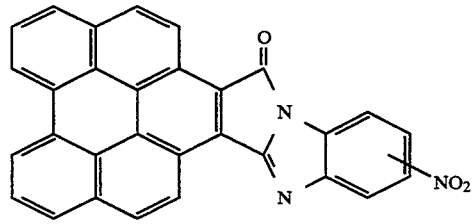 (1-10)
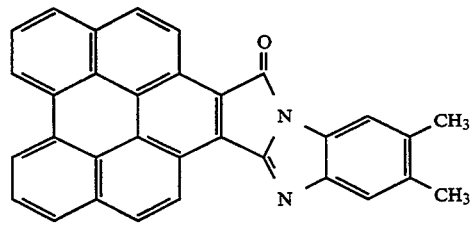 (1-11)
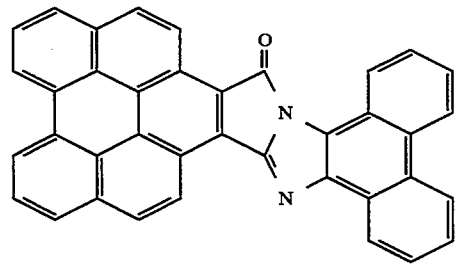 (1-12)
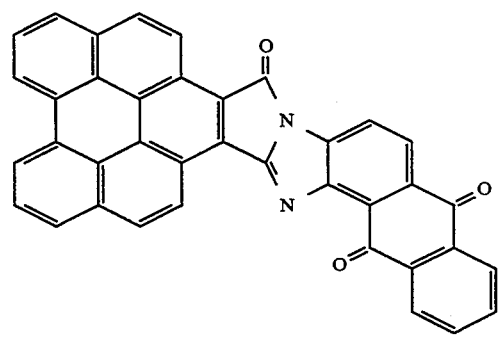 (1-13)

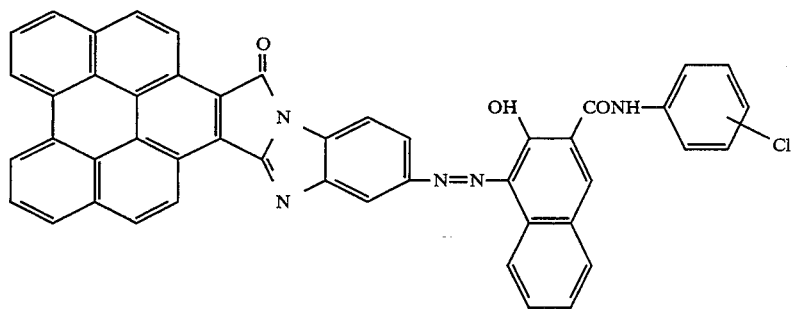
(1-14)
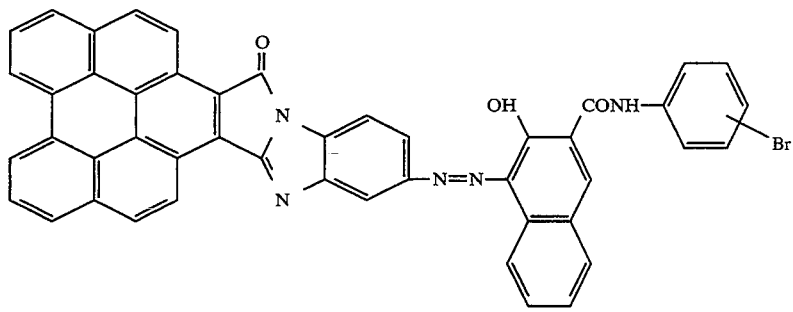
(1-15)
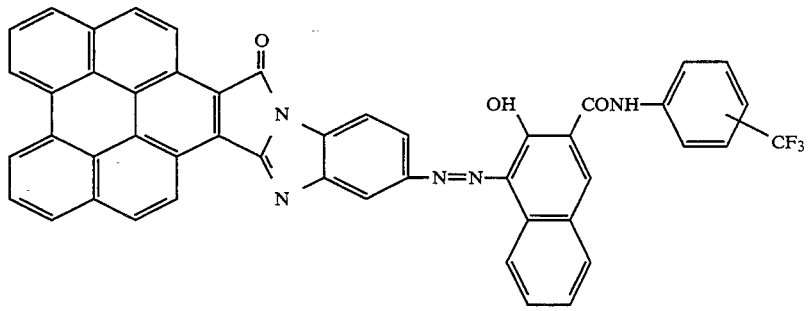
(1-16)
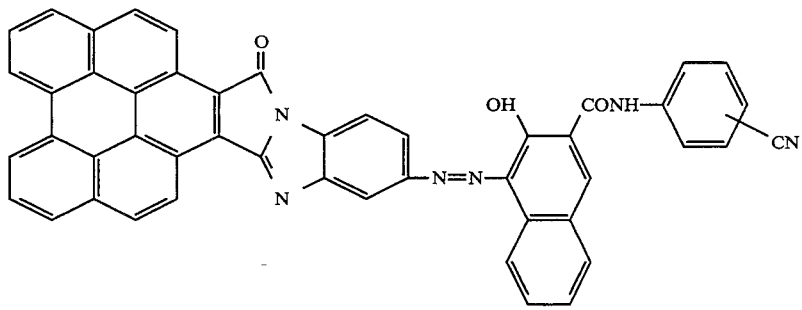
(1-17)
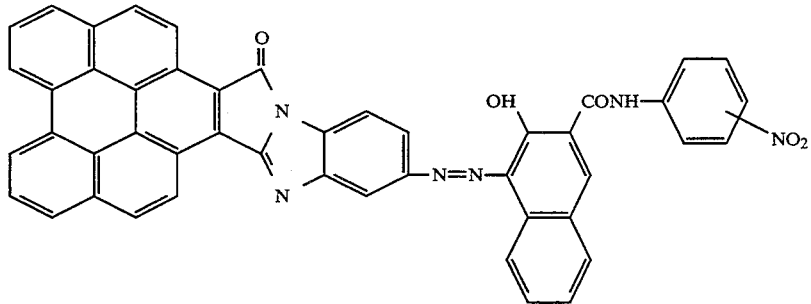
(1-18)

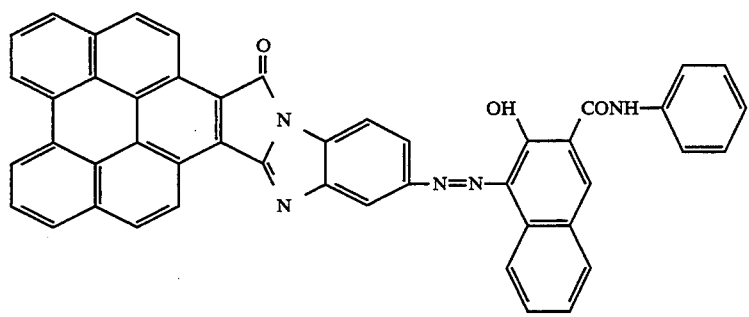
(1-19)
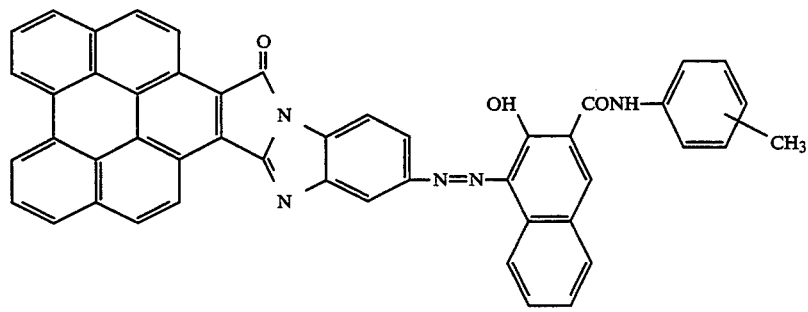
(1-20)
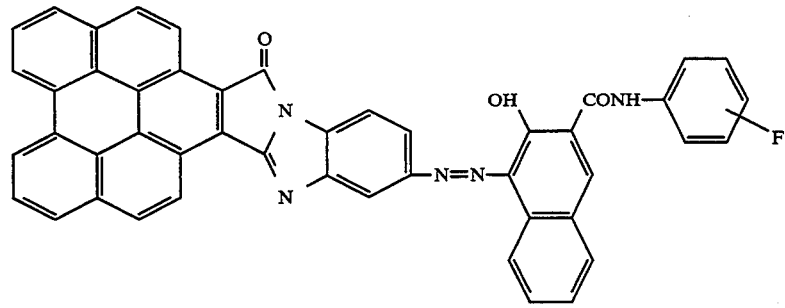
(1-21)
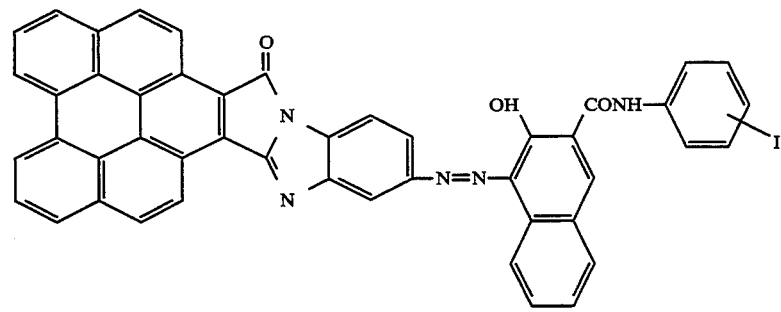
(1-22)
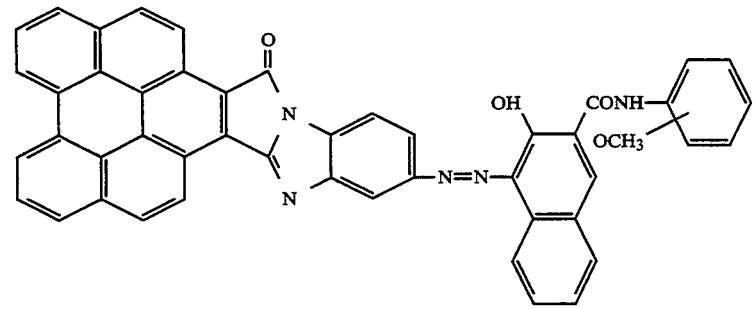
(1-23)

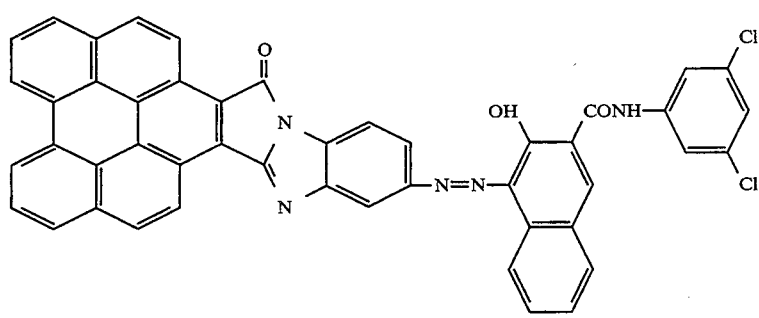
(1-24)
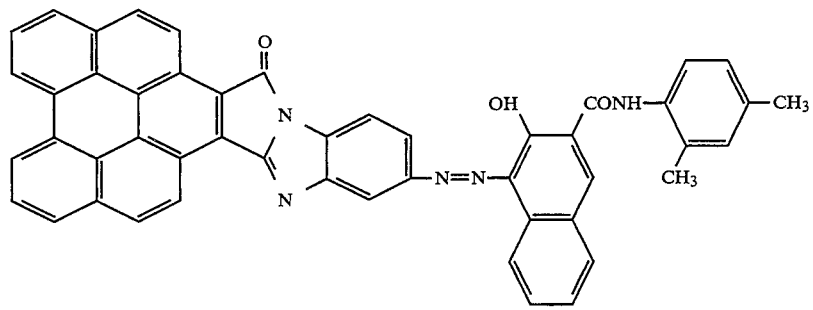
(1-25)
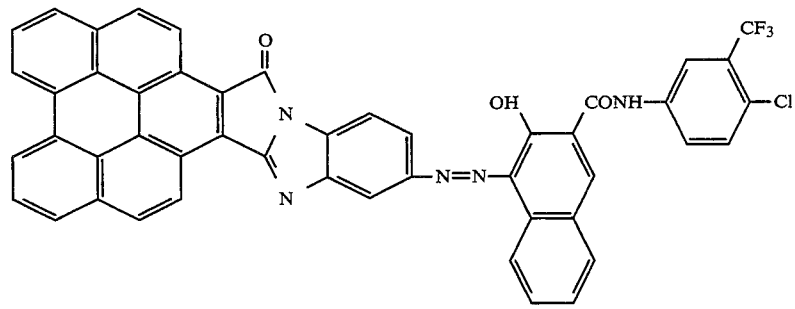
(1-26)
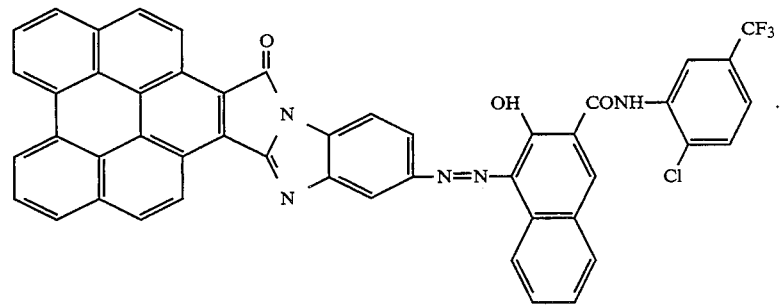
(1-27)